US012462921B2

(12) United States Patent
Schueffler et al.

(10) Patent No.: US 12,462,921 B2
(45) Date of Patent: Nov. 4, 2025

(54) UNIVERSAL SLIDE VIEWER

(71) Applicant: MEMORIAL SLOAN KETTERING CANCER CENTER, New York, NY (US)

(72) Inventors: Peter Schueffler, New York, NY (US); Thomas Fuchs, New York, NY (US)

(73) Assignee: MEMORIAL SLOAN KETTERING CANCER CENTER, New York, NY (US)

( * ) Notice: Subject to any disclaimer, the term of this patent is extended or adjusted under 35 U.S.C. 154(b) by 397 days.

(21) Appl. No.: 17/637,221

(22) PCT Filed: Aug. 24, 2020

(86) PCT No.: PCT/US2020/047687
§ 371 (c)(1),
(2) Date: Feb. 22, 2022

(87) PCT Pub. No.: WO2021/041343
PCT Pub. Date: Mar. 4, 2021

(65) Prior Publication Data
US 2022/0301691 A1    Sep. 22, 2022

Related U.S. Application Data

(60) Provisional application No. 62/890,953, filed on Aug. 23, 2019.

(51) Int. Cl.
G16H 30/40        (2018.01)
G16H 30/20        (2018.01)
(Continued)

(52) U.S. Cl.
CPC ............ *G16H 30/40* (2018.01); *G16H 30/20* (2018.01); *G16H 40/67* (2018.01); *G16H 50/20* (2018.01); *G16H 50/70* (2018.01)

(58) Field of Classification Search
None
See application file for complete search history.

(56) References Cited

U.S. PATENT DOCUMENTS 9,891,804 B2      2/2018  Henderson et al.
2007/0274585 A1*  11/2007 Zhang ............. G16H 30/20
                                                382/132
(Continued)

FOREIGN PATENT DOCUMENTS

CN     103069415 A    4/2013
CN     106991712 A    7/2017
(Continued)

OTHER PUBLICATIONS

International Search Report and Written Opinion of the International Searching Authority issued in PCT Application No. PCT/US2020/047687, mailed Nov. 9, 2020.

*Primary Examiner* — Wen W Huang
(74) *Attorney, Agent, or Firm* — ArentFox Schiff LLP; Daniel W. Clarke

(57) ABSTRACT

The present disclosure relates generally to image viewers, in particular biomedical images viewers that can concurrently render biomedical images at various magnifications or resolutions. The computing system can identify tiles from a first portion of a biomedical image. Each tile can correspond to a magnification level and coordinates in the biomedical image. The computing system can provide the tiles for concurrent display in respective graphical user interface (GUI) elements. The computing system can detect an interaction with a GUI element. The computing system can identify a change in coordinates for a tile displayed in the GUI element based on the interaction. The computing system can determine a second change in the other concurrently displayed tiles based on the change in coordinates. The (Continued)

computing system can update the concurrent display of the tiles based on the changes.

20 Claims, 9 Drawing Sheets

(51) Int. Cl.
*G16H 40/67* (2018.01)
*G16H 50/20* (2018.01)
*G16H 50/70* (2018.01)

(56) References Cited

U.S. PATENT DOCUMENTS

| | | | |
|---|---|---|---|
| 2008/0304621 A1* | 12/2008 | Huber | G16H 30/20 345/619 |
| 2011/0141103 A1* | 6/2011 | Cohen | G06T 19/00 345/419 |
| 2012/0069049 A1 | 3/2012 | Howe et al. | |
| 2013/0290826 A1* | 10/2013 | Niwa | G16H 30/20 715/230 |
| 2014/0089846 A1* | 3/2014 | Ogura | G06F 3/0485 715/799 |
| 2014/0184778 A1* | 7/2014 | Takayama | G06T 3/40 348/79 |
| 2015/0310652 A1* | 10/2015 | Dobson | G06T 11/60 345/629 |
| 2015/0317452 A1* | 11/2015 | Kozuka | G06F 3/04842 705/2 |
| 2016/0042511 A1 | 2/2016 | Chukka et al. | |
| 2017/0038914 A1 | 2/2017 | Kawagishi | |
| 2017/0209125 A1* | 7/2017 | Rai | G06F 3/0488 |
| 2019/0051018 A1 | 2/2019 | Hwang | |
| 2021/0327564 A1* | 10/2021 | Ferreira | G16H 30/40 |

FOREIGN PATENT DOCUMENTS

| | | |
|---|---|---|
| JP | 2014130221 A | 7/2014 |
| WO | 2015155808 A1 | 10/2015 |

* cited by examiner

UNIVERSAL SLIDE VIEWER

CROSS REFERENCE TO RELATED APPLICATIONS

The present application is a U.S. National Phase Application under 35 U.S.C. § 371 of International Application No. PCT/US2020/047687, filed Aug. 24, 2020, which claims priority to and the benefit of U.S. Provisional Patent Application No. 62/890,953, titled "Universal Slide Viewer," filed Aug. 23, 2019, the contents of which are incorporated herein by reference in their entirety.

TECHNICAL FIELD

The present application relates generally to viewing interfaces for rendering biomedical images, including but not limited to using slide viewers such as universal slide viewers for images having variety of formats, configurations, and parameters.

BACKGROUND

An image can be displayed and rendered on a computing device via an application. The view of the image can be controlled via one or more user interface elements of the application.

SUMMARY

The systems and methods of the present disclosure can enable concurrent viewing for biomedical images at different magnification levels, normalized for different resolutions and color schemes. The universal slide view further provides support for multiple synchronized views at different magnification levels when pan or zoom operations are applied to an image, among other aspects related to biomedical image viewing. The system sand methods described herein can provide seamless and fast pixel-accurate annotation of a slide at different magnifications. Rasterized BMP images store the can annotations to improve storage space with sacrificing accuracy or speed.

At least one aspect of the present disclosure relates to a method. The method can include identifying a plurality of tiles from a first portion of a biomedical image that is derived from a tissue sample via a histopathological image preparer. Each tile of the plurality of tiles can be acquired at one of a plurality of magnification factors and defined by a corresponding set of coordinates within the biological image. At least one of the plurality of tiles can correspond to at least a subset of the first portion. The method can include providing the plurality of tiles for concurrent display via a corresponding plurality of graphical user interface elements. The method can include detecting an interaction with a GUI element from the plurality of GUI elements to modify a tile of the plurality of tiles. The method can include identifying a first change to a first set of coordinates defining the tile in response to the interaction with the GUI element. The method can include determining a second change to apply to a second set of coordinates defining each tile of a remainder of the plurality of tiles based on the first change to the first set of coordinates. The method can include updating the displaying of the plurality of tiles in the corresponding plurality of GUI elements by applying the first change to the first set of coordinates for the tile upon which the interaction is detected and the second change to the second set of coordinates for each tile of the remainder of the plurality of tiles.

In some implementations, the method can include identifying a second portion of the biomedical image based on the first change to be applied to the first set of coordinates defining the tile. In some implementations, the method can include determining the second change to apply to the second set of coordinates based on a comparison of the first portion and the second portion. In some implementations, the plurality of GUI elements can include a first GUI element to display a reference tile of the plurality of tiles and one or more second GUI elements to display corresponding one or more other tiles of the plurality of tiles.

In some implementations, detecting the interaction can further include detecting the interaction to perform at least one of a zoom operation within the tile or a panning operation to move from the tile. In some implementations, identifying the plurality of tiles can further include streaming, to a client device, the plurality of tiles corresponding to the first portion of the biomedical image for display on the client device via the corresponding plurality of GUI elements.

In some implementations, the method can include identifying an annotation via a second GUI element of the plurality of GUI elements. In some implementations, the annotation can identify one or more pixel coordinates on a second tile of the plurality of tiles displayed via the second GUI element. In some implementations, the annotation can indicate a presence of one or more conditions in an area on the tissue sample corresponding to the one or more pixel coordinates on the second tile. In some implementations, the method can include storing, in one or more data structures, an association between the annotation and the biomedical image.

In some implementations, the method can include generating a plurality of indexed color values corresponding to the one or more pixel coordinates identified by the annotation. In some implementations, the method can include storing the plurality of indexed color values as a map for the annotation. In some implementations, the method can include updating the displaying of the plurality of tiles in the corresponding plurality of GUI elements based on the annotation identified in the second tile displayed via the second GUI element.

In some implementations, the method can include identifying, for a third tile of the plurality of tiles, a respective portion of the biomedical image. In some implementations, the method can include applying a color modification operation on the respective portion for the at least one tile while maintaining a remaining portion of the biomedical image. In some implementations, the method can include updating the displaying of the third tile in a corresponding GUI element of the plurality of GUI elements based on the application of the color modification operation to the respective portion. In some implementations, the method can include identifying a source for the biomedical image from which the plurality of tiles are derived. In some implementations, the method can include selecting from a plurality of color modification operations. In some implementations of the method, the color modification operation can be based on the source identified for the biomedical image.

At least one other aspect of the present disclosure relates to a system. The system can include a computing system having one or more processors coupled to a memory. The system can identify a plurality of tiles from a first portion of a biomedical image that is derived from a tissue sample via a histopathological image preparer. Each tile of the plurality of tiles can be acquired at one of a plurality of magnification factors and defined by a corresponding set of coordinates within the biological image, at least one of the plurality of tiles corresponding to at least a subset of the first portion. The system can provide the plurality of tiles for concurrent display via a corresponding plurality of graphical user interface elements. The system can detect an interaction with a GUI element from the plurality of GUI elements to modify a tile of the plurality of tiles. The system can identify a first change to a first set of coordinates defining the tile in response to the interaction with the GUI element. The system can determine a second change to apply to a second set of coordinates defining each tile of a remainder of the plurality of tiles based on the first change to the first set of coordinates. The system can update the displaying of the plurality of tiles in the corresponding plurality of GUI elements by applying the first change to the first set of coordinates for the tile upon which the interaction is detected and the second change to the second set of coordinates for each tile of the remainder of the plurality of tiles.

In some implementations, the system can identify a second portion of the biomedical image based on the first change to be applied to the first set of coordinates defining the tile. In some implementations, the system can determine the second change to apply to the second set of coordinates based on a comparison of the first portion and the second portion. In some implementations, the plurality of GUI elements can include a first GUI element to display a reference tile of the plurality of tiles and one or more second GUI elements to display corresponding one or more other tiles of the plurality of tiles. In some implementations, the system can detect the interaction to perform at least one of a zoom operation within the tile or a panning operation to move from the tile.

In some implementations, the system can stream, to a client device, the plurality of tiles corresponding to the first portion of the biomedical image for display on the client device via the corresponding plurality of GUI elements. In some implementations, the system can identify an annotation via a second GUI element of the plurality of GUI elements. In some implementations, the annotation can identify one or more pixel coordinates on a second tile of the plurality of tiles displayed via the second GUI element. In some implementations, the annotation can indicate a presence of one or more conditions in an area on the tissue sample corresponding to the one or more pixel coordinates on the second tile. In some implementations, the system can store, in one or more data structures, an association between the annotation and the biomedical image.

In some implementations, the system can generate a plurality of indexed color values corresponding to the one or more pixel coordinates identified by the annotation. In some implementations, the system can store the plurality of indexed color values as a map for the annotation. In some implementations, the system can update the displaying of the plurality of tiles in the corresponding plurality of GUI elements based on the annotation identified in the second tile displayed via the second GUI element.

In some implementations, the system can identify, for a third tile of the plurality of tiles, a respective portion of the biomedical image. In some implementations, the system can apply a color modification operation on the respective portion for the at least one tile, while maintaining a remaining portion of the biomedical image. In some implementations, the system can update the display of the third tile in a corresponding GUI element of the plurality of GUI elements based on application the color modification operation to the respective portion. In some implementations, the system can identify a source for the biomedical image from which the plurality of tiles are derived. In some implementations, the system can select from a plurality of color modification operations. In some implementations, the color modification operation can be based on the source identified for the biomedical image.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using a suitable apparatus, which can take the form of one or more programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The present techniques, including presenting multiple magnified views of a biomedical image using a universal slide view, can enable pathologists or other healthcare processions with enhanced tools to view and annotate medical images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a universal slide viewer in accordance with one or more illustrative implementations;

Section B describes systems and methods for presenting various views of a biomedical image at different magnification levels, in accordance with one or more implementations.

Section C describes a network environment and computing environment which may be useful for practicing various embodiments described herein.

A. Universal Slide Viewer

Figure 1:
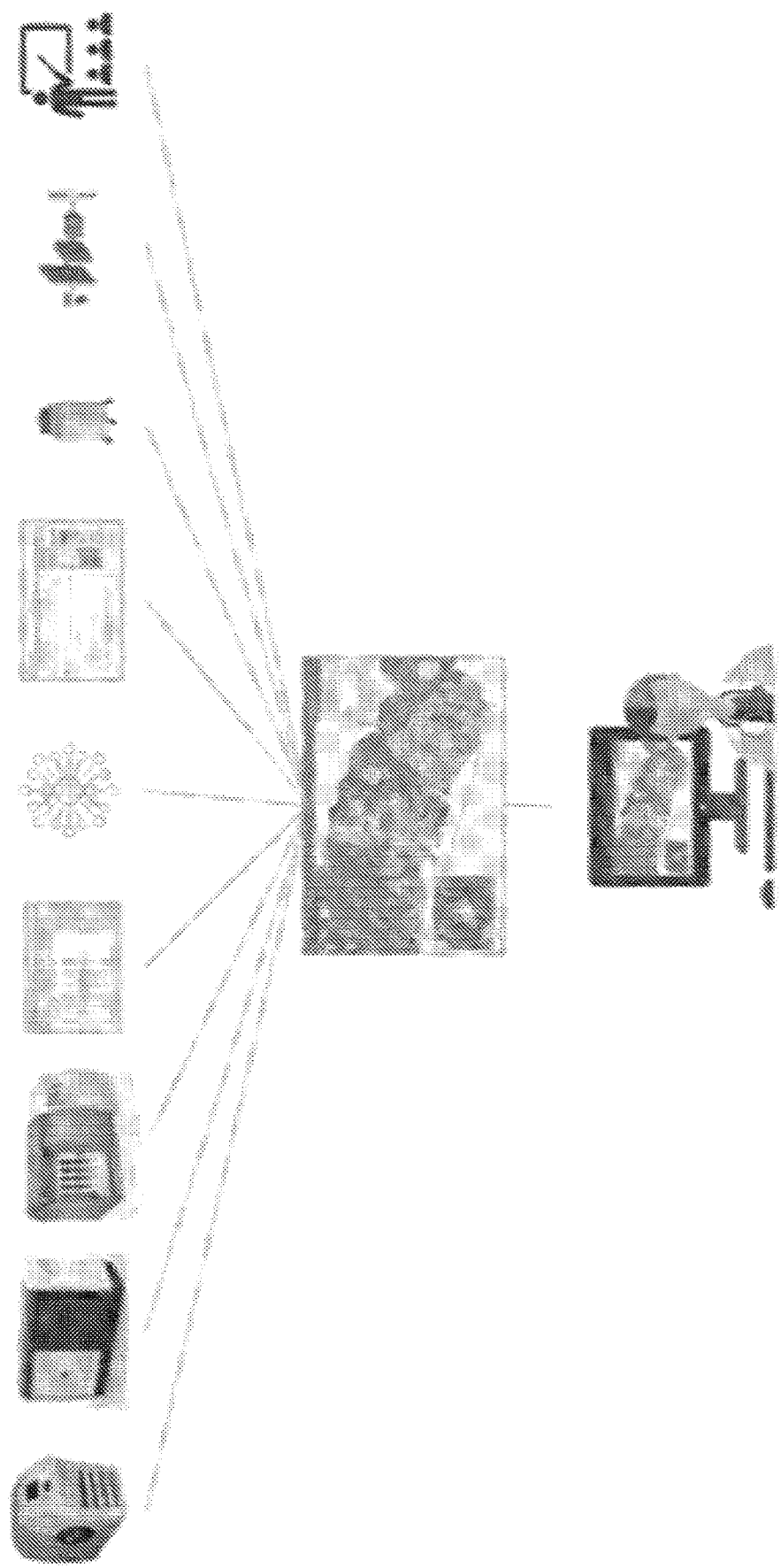
FIG. 1 depicts a diagram of a universal slide view interfacing with various vendors, in accordance with an illustrative embodiment.
Figure 2:
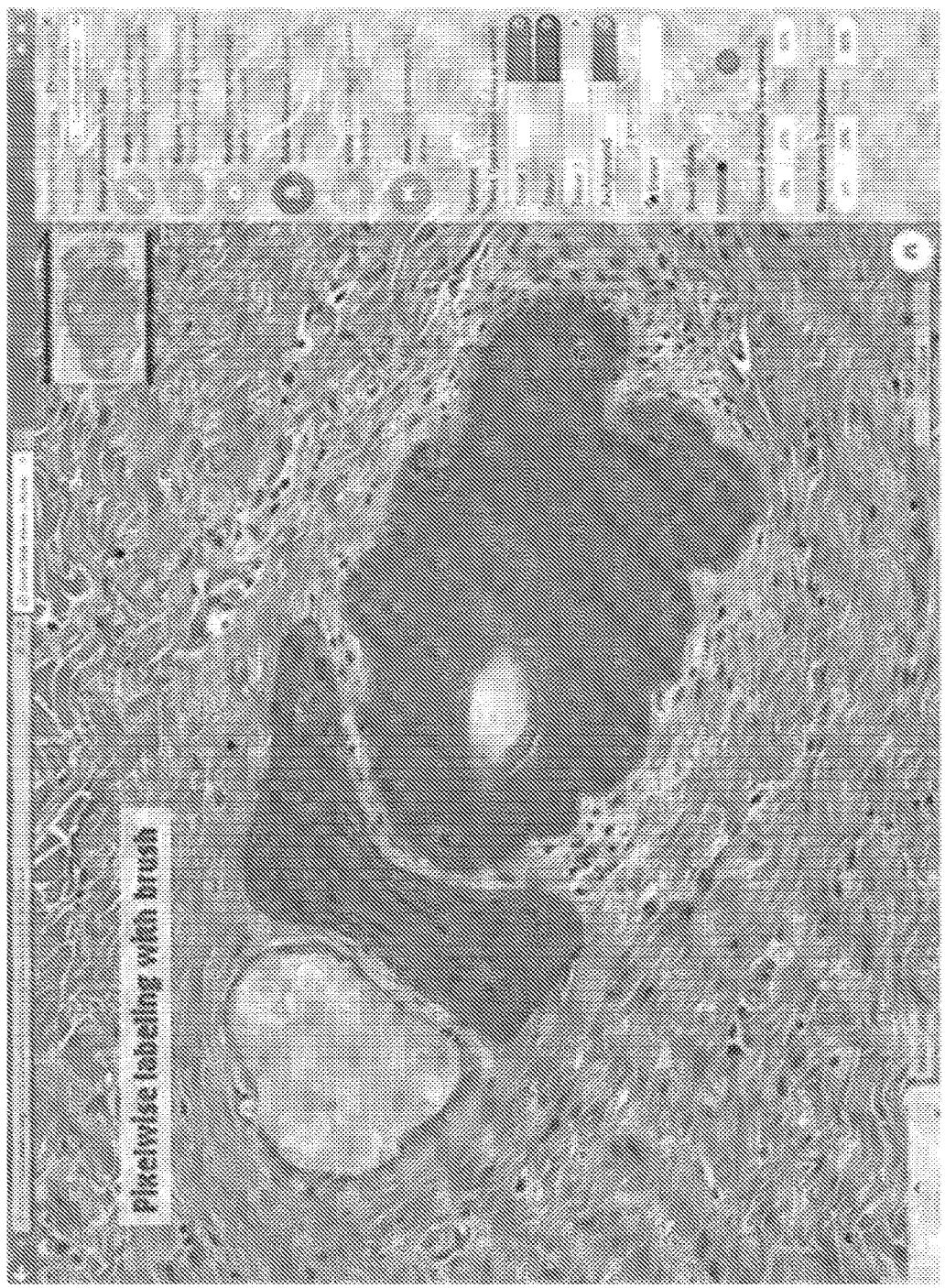
FIG. 2 depicts a screenshot of an interface of the universal slide viewer rendering a biopsy with pixel-wise labeling, in accordance with an illustrative embodiment.
Figure 3:
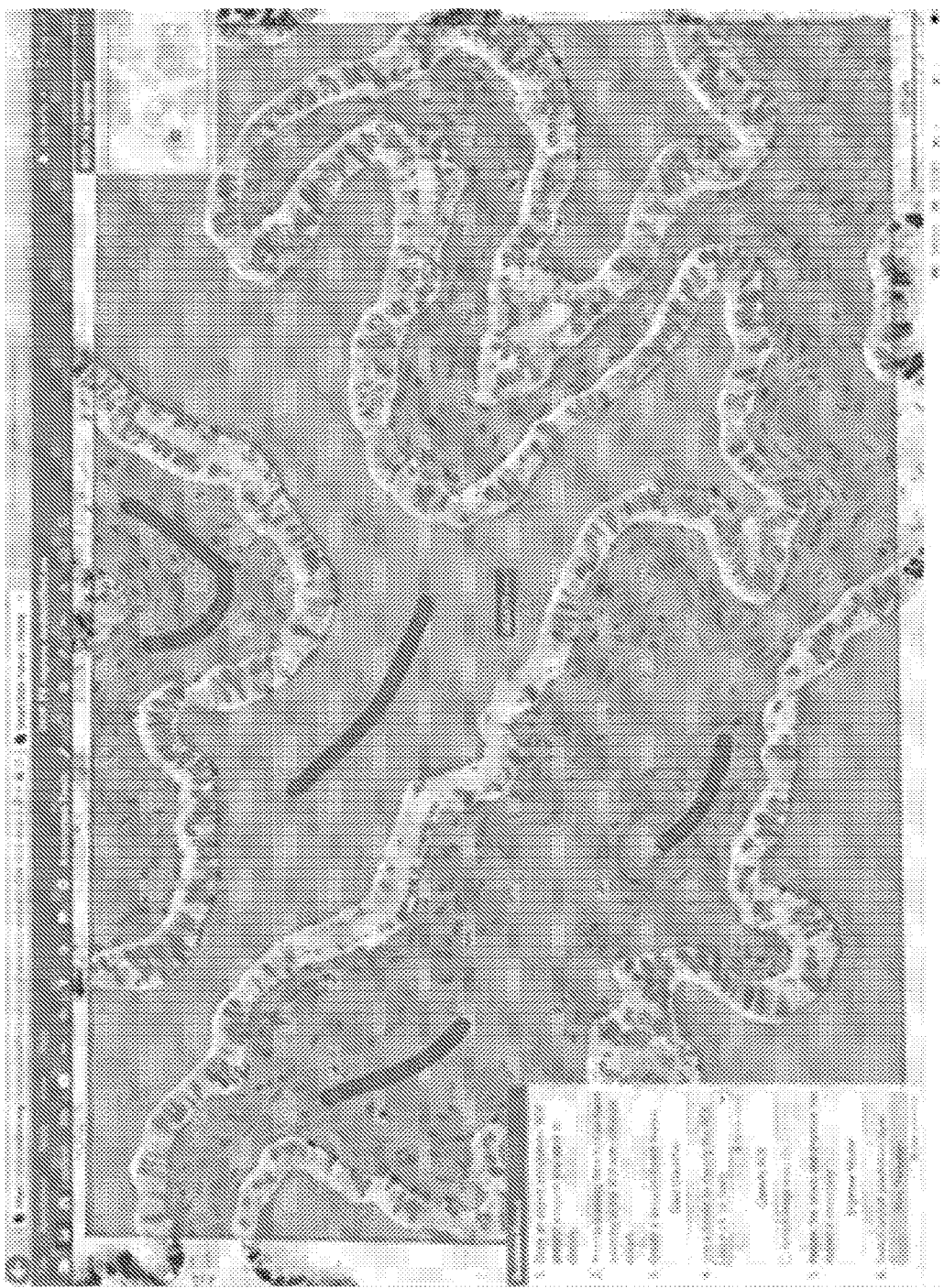
FIG. 3 is a screenshot of an interface of the universal slide viewer rendering a classification of a biopsy, in accordance with an illustrative embodiment.

Hospitals may have multiple vendors, scanners, or file formats for biomedical imaging techniques, and thus may have multiple applications or services to render biomedical images. Certain viewers may support only vector-based graphical annotations, which can be inaccurate and generate discrepancies. Manual assessment of digital slides can be more and more time consuming as there are more and more digital slides per patient To solve at least the problems laid out above, referring to FIG. 1, the universal slider can enable viewing for different vendors, normalized for different resolutions and color schemes. Support of multiple views and conference sessions. Referring to FIG. 2, the slide viewer supports seamless and fast pixel-accurate annotation of a slide at different magnifications. Rasterized BMP images store the annotations. Referring to FIG. 3, the viewer supports training and testing of automated machine learning models based on the slides and annotations of step 1 and 2. Classification outcomes are visualized quantitatively (result tables) and qualitatively (overlay of prediction maps, heatmaps, confidence maps, etc.). Thus, informed decision support may be provided for a range of applications in computational pathology.

1(a). Normalization of Resolution for Each Magnification

Different vendors/scanners scan at different resolution per pixel, even for the same magnification. Therefore, "20×" can look differently large for different scanners. On the other hand, pathologists appreciate "20×" to be same size for every slide. Therefore, the slide viewer incorporates a normalization factor for the zoom level such that 20× has always the same resolution of 0.45 μm/px with the formula (SlideObjectivePower*SlideMPP/20)/0.45, where SlideObjectivePower is the current slide's objective power and SlideMPP is the current slide's resolution. Other magnification levels are normalized analogously.

1(b). Normalization of Color Scheme for Each Type of Staining to Compensate for Fading and Color Shift Different scanners have different color tables when scanning the images (similar as digital cameras represent the same scene with slightly different colors). Moreover, the color scheme might change over time, and old scanners show faded or biased colors compared to new ones. On the other hand, pathologists appreciate slides to look similar regardless of the vendor or age of the scanner. The slide viewer will compensate the color bias by normalizing the tile's color such that the H&E stained slides look similar to each other regarding the color (compensation for fading and color shift).

2(a). Main Slide Window with Multiple Smaller Windows at Different Magnifications The viewer supports multiple views for enhanced slide investigation (makes most sense with large screens). This comprises:

Signout view: One main window viewing a slide. Next to it two to three smaller windows with the same slide at increasingly higher magnification levels. Advantage: The pathologist can instantaneously investigate the slide at different magnification levels without switching a lever (microscope) or clicking a button (other viewers).

2(b). Multiple Slides Displayed at Same Time and Synced with Each Other in Terms of Region of Slide Visible, Zoom, Etc.

Multi view: Two or four (or more) slides are displayed next to each other, in sync with the navigation. Different slide dimensions and zooms are compensated, such that the slides are synchronously panned and zoomed. Advantage: The pathologist can instantaneously look at different stains of the same tissue (e.g. H&E, IHC, MIB-1, CD3, etc.). This facilitates the assessment of the tissue.

3. In-Viewer Screen-Sharing without Requiring Additional Software Components

The viewer supports conference sessions: Anybody can easily create a conference for a specific time and a collection of slides for this conference. People that join the conference at the given time will then see on their screen what the "lead" sees and navigates. This is quite similar to a shared desktop screen, but completely implemented in the viewer, without the need of additional screen sharing software. Advantage: Useful for educational purposes (teacher, students), and remote sessions (conference/agreement sessions, tumor boards with pathologists not being onsite).

4. On-the-Fly False Color Representation on a Tile-by-Tile Basis

Out viewer supports on-the-fly false color representation of the slide, without pre-computation. This is done by editing only those tiles which are currently shown to the user. Examples are color deconvolution normalized color (RGB→R/(R+G+B), G/(R+G+B), B/(R+G+B)), optical density (RGB→−log 10(R/255), −log 10(G/255), −log 10(B/255)).

5. Supervision Mode for Review of Annotations

The viewer supports a supervision mode, in which a (senior) pathologist can review other (junior) pathologists' annotations. This is beneficial e.g. for large scale annotation where research fellows annotate many slides and a senior pathologist reviews them. This is solved with the implementation of different access levels of the individual users using the slide viewer.

6. Use of Openslide

The tile server uses the library openslide, to extract the currently viewed tiles from the proprietary file formats, at the current magnification. This allows for optimal data streaming from the server to the client, accessing only the relevant part of the slide.

7. Load Balancing

Since multiple users access several files simultaneously, load balancing is implemented to the tiles being stream from four tile servers. These tile servers can be physical servers or virtual servers in the cloud.

8. Direct Delivery of Cached Image Tiles

To increase the speed of tiling delivery to the client, generated tiles (generated by the openslide library from the original scan files) are cached on the server as jpg or png. Generation of a new tile with openslide and delivering the resulting image tile is significantly slower than directly delivering the cached image tile. Therefore, the caching procedure increases the viewing speed significantly.

9. Labeling on Slide Viewer

The slide viewer supports painting on the image with a computer mouse, pen, finger or other input devices (depending on the computer device).

The annotation is visualized as an overlay and stored as a 4 bpp bitmap. These 4 bits per pixel bitmaps allow:

Small file size even for large dimensions (100 k×80 k pixels). 4 bpp bitmaps are highly compressible.

16 different annotations per file.

Fast and easy painting on the image, pixel accurate labels, and e.g. doughnut shaped annotations which are not as easily possible with vector-based annotations.

Still, a disadvantage is that they are very large in file size when uncompressed (~1 Gb). Therefore, loading the label files into RAM can be problematic. This problem is solved using memory mapped files. Using memory mapped files allows for:

Simultaneous access of one label file even from different processes (e.g. classification and viewing processes).

Fast reading and writing of those files.

Scripts and routines were composed to access (read/write) those files. These scripts comprise pyramide level access to fit into the pyramide-architecture for the tissue images. This ensures that only that part of the label file is streamed to the client, which is currently viewed in the viewer, at the current magnification. This reduces the streamed data significantly and speeds up the viewing process of the annotations.

On the local client device, the overlay (as well as the main slide image) is visualized using the OpenSeadragon library. This library allows for seamless zooming and panning. The painting itself on the client device is implemented using the OpenSeadragon plugin for fabric.js.

10. Experiment Setup Interface

The viewer has an experiment-setup interface:

The user creates a new experiment, and selects images which should be included as training and test set.

The user provides annotations for different classes on the training and test images (e.g. own annotations or from other annotators).

The user chooses an algorithm to be trained and tested on the dataset. The algorithm is modular and can be plugged in. Typically, a suitable algorithm is developed by a computational pathology research group.

The viewer trains and tests the machine learning algorithm either locally on the server, or accessing the HPC cluster.

The results are stored and visualized to the user. Quantified error measures are reported (e.g. accuracies, precision, recall, etc.), as well as qualitative results, such as overlay images of heatmaps. These heatmaps are similar 4 bbp bitmaps and handled similarly as the label files.

The application of a pre-trained classifier is then:

The user selects a slide or a set of slides to be classified (e.g. prostate cancer slides).

The user selects a pre-trained classifier from a list of available classifiers. Such classifiers have been developed and validated beforehand on different datasets (e.g. by research groups) (e.g. a prostate cancer Gleason score predictor).

The viewer applies the classifier on the selected slides, either locally on the server machine or using a HPC cluster.

The results are stored and visualized to the user. Quantified error measures are reported (e.g. accuracies, precision, recall, etc.), as well as qualitative results, such as overlay images of heatmaps. These heatmaps are similar 4 bbp bitmaps and handled similarly as the label files.

B. Systems and Methods of Rendering a Biomedical Image at Different Magnification Levels Pathologists and other healthcare professionals often view slides at various magnification levels, for example using a microscope or other imaging technology. One limitation of the classical microscope is its viewing ability: only one single magnification view can be displayed to a viewer at a given time. If a different view is required for a particular task, the magnification level of the microscope must be changed. With the advancement of computer imaging technology, very high resolution images can be taken of tissue samples. Very high resolution images are often very large in size and require substantial computational resources to render. Further, biomedical image viewers suffer from similar problems as the classical microscope, where only a single magnification level can be rendered at a given time.

When analyzing a tissue sample, either in a biomedical image or under a microscope, pathologists often analyze a biomedical image a different magnification levels to assess certain qualities of the tissue sample at different scales. However, continuously switching between views can be cumbersome. Therefore, it would be advantageous for a system to provide additional viewing screens that can render a biomedical image at different magnifications. The systems and methods so of the present disclosure provide such a solution.

The systems and methods described herein provide a universal slide viewer that can render multiple views of a biomedical image simultaneously while at different magnification levels. Each of the multiple views can be synchronized to a coordinate of interest in the biomedical image, such the same coordinate can be viewed at different magnification levels without changing position or the magnification of a main display window. Additional views can be instantiated or dismissed as needed by a user, and can each be used to provide pixel-level granular annotations across magnification levels in real-time. Because biomedical images are often very large, a rendering server can select and render only the portions of the biomedical image that are requested by a user. The user can request different portions of the medical image in real-time through the interface provided by the universal slide viewer. Thus, the systems and methods described herein provide a technical improvement to biomedical image rendering platforms by rendering only the portions of the biomedical image that are visible. These and other aspects of this technical solution are described in greater detail below.

Figure 4:
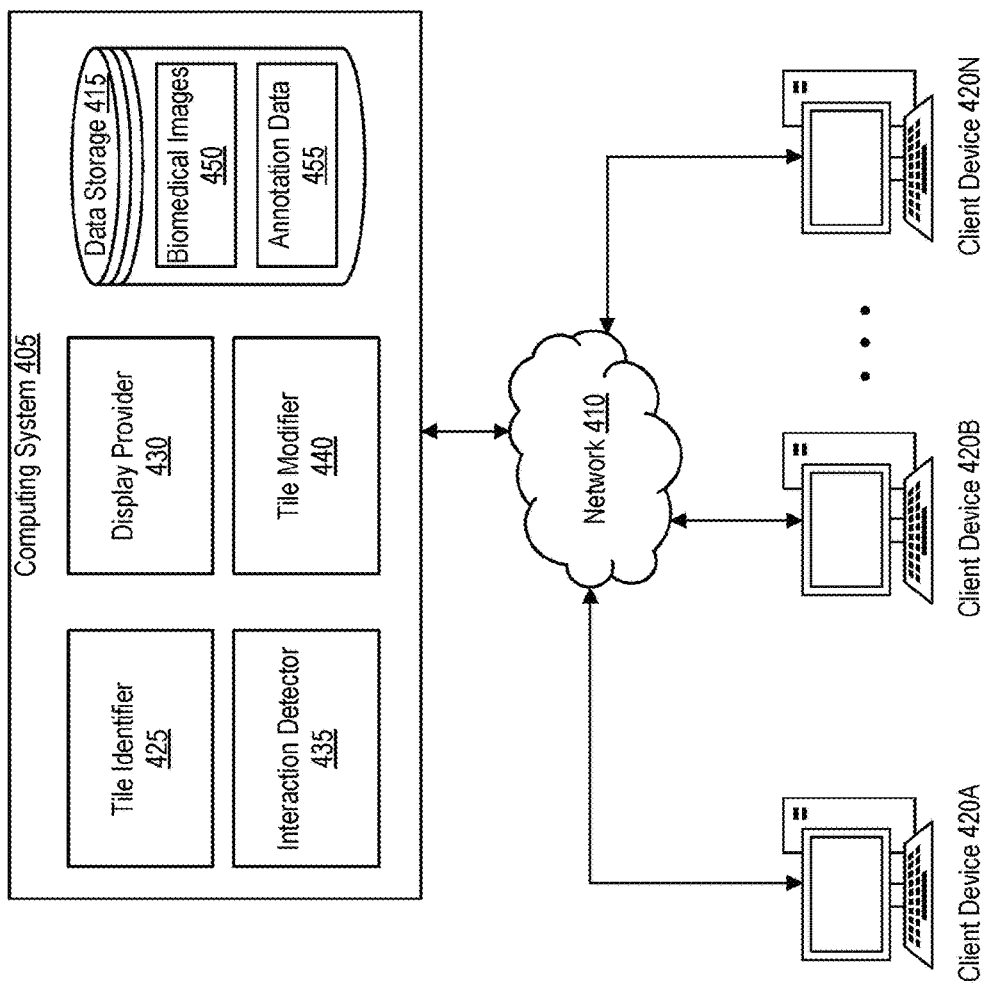
FIG. 4 depicts a system for providing multiple views of a biomedical image for concurrent display, in accordance with an illustrative embodiment.

Referring now to FIG. 4, depicted is a block diagram of an example system 400 for presenting one or more viewing regions for rendering biomedical images. The system 400 can include at least one computing system 405, at least one client device 420A-N (sometimes referred to generally as "client device(s) 420"), at least one network 410, and at least one data storage 415. In some implementations, the computing system 405 can include the data storage 415, and in some implementations, the data storage 415 can be external to the computing system 405. For example, when the data storage 415 is external to the computing system 405, the computing system 405 (or the components thereof) can communicate with the data storage 415 via the network 410. The computing system 405 can include at least one tile identifier 425, at least one display provider 430, at least one interaction detector 435, and at least one tile modifier 440. The data storage 415 can include at least one biomedical image(s) 450, and at least one annotation data 455.

Figure 9:
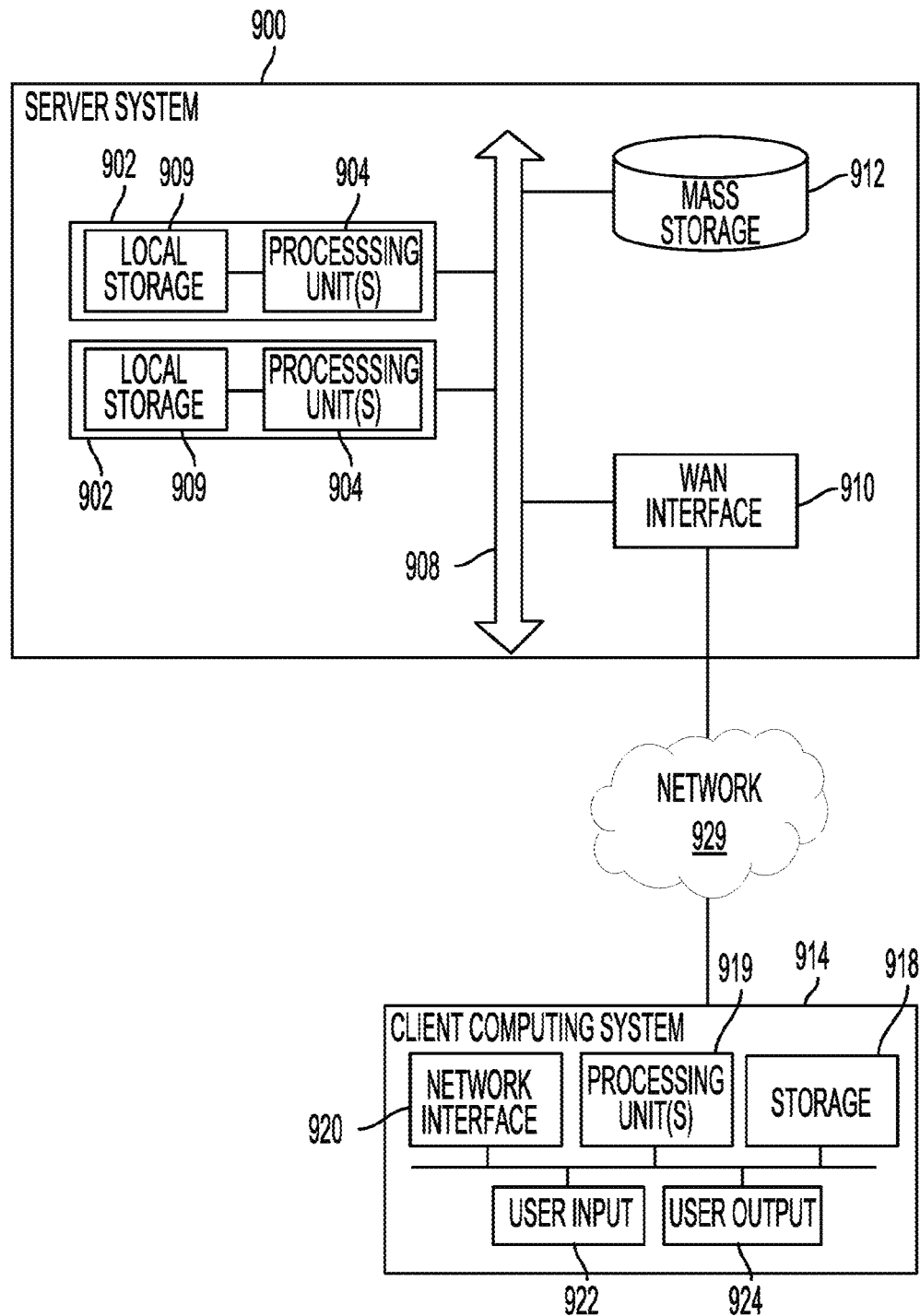
FIG. 9 depicts a block diagram of a server system and a client computer system, in accordance with an illustrative embodiment.

Each of the components (e.g., the computing system 405, the client devices 420, the network 410, the tile identifier 425, the display provider 430, the interaction detector 435, the tile modifier 440, the data storage 415, etc.) of the system 400 can be implemented, for example, using any of the various computing devices described herein, including the server system 900 or the client computer system 914 described herein below in conjunction with FIG. 9. The computing system 405 can perform any of the features or functions described herein above in Section A.

In further detail, the computing system 405 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The computing system 405 can include one or more computing devices or servers that can perform various functions as described herein. The computing system 405 can include any or all of the components and perform any or all of the functions of the server system 900 or the client computing system 914 described herein in conjunction with FIG. 9.

The network 410 can include computer networks such as the Internet, local, wide, metro or other area networks, intranets, satellite networks, other computer networks such as voice or data mobile phone communication networks, and combinations thereof. In some implementations, the network 410 can be, be a part of, or include one or more aspects of the network 929 described herein below in conjunction with FIG. 9. The computing system 405 of the system 1 can communicate via the network 410, for instance with at least one client device 420A. The network 410 may be any form of computer network that can relay information between the client device 420A, the computing system 405, and one or more content sources, such as web servers, amongst others. In some implementations, the network 410 may include the Internet and/or other types of data networks, such as a local area network (LAN), a wide area network (WAN), a cellular network, a satellite network, or other types of data networks. The network 410 may also include any number of computing devices (e.g., computers, servers, routers, network switches, etc.) that are configured to receive and/or transmit data within the network 410. The network 410 may further include any number of hardwired and/or wireless connections. Any or all of the computing devices described herein (e.g., the computing system 405, the server system 900, the client computing system 914 etc.) may communicate wirelessly (e.g., via WiFi, cellular, radio, etc.) with a transceiver that is hardwired (e.g., via a fiber optic cable, a CAT5 cable, etc.) to other computing devices in the network 410. Any or all of the computing devices described herein (e.g., the computing system 405, the server system 900, the client computing system 914, etc.) may also communicate wirelessly with the computing devices of the network 410 via a proxy device (e.g., a router, network switch, or gateway).

The data storage 415 can be a database configured to store and/or maintain any of the information described herein. The data storage 415 can maintain one or more data structures, which may contain, index, or otherwise store each of the values, pluralities, sets, variables, vectors, or thresholds described herein. The data storage 415 can be accessed using one or more memory addresses, index values, or identifiers of any item, structure, or region maintained in the data storage 415. The data storage 415 can be accessed by the components of the computing system 405, or any other computing device described herein, via the network 410. In some implementations, the data storage 415 can be internal to the computing system 405. In some implementations, the data storage 415 can exist external to the computing system 405, and may be accessed via the network 410. The data storage 415 can be distributed across many different computer systems or storage elements, and may be accessed via the network 410 or a suitable computer bus interface. The computing system 405 can store, in one or more regions of the memory of the computing system 405, or in the data storage 415, the results of any or all computations, determinations, selections, identifications, generations, constructions, or calculations in one or more data structures indexed or identified with appropriate values. Any or all values stored in the data storage 415 may be accessed by any computing device described herein, such as the computing system 405, to perform any of the functionalities or functions described herein.

The client device 420 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The client device 420 can include one or more computing devices or servers that can perform various functions as described herein. The client device 420 can include any or all of the components and perform any or all of the functions of the server system 900 or the client computing system 914 described herein below in conjunction with FIG. 9.

The client device 420 can be configured to display any information in one or more graphical user interfaces (GUIs).

The GUIs can be a part of, or rendered in, one or more applications executing on the client device 420, such as a web browser, native application, or other sort of biomedical image 450 viewing application. To display the information in the GUI, the client device 420 can access display information, for example from its internal memory that corresponds to pixels to be rendered on a display of the client device 420. The display information can include instructions to generate different display shapes, images, or other aspects of a graphical user interface that can include one or more intractable objects, such as image tiles, buttons, scroll bars, text input boxes, radio boxes, check boxes, among other actionable input objects. In some implementations, the client device 420 can receive at least a part of the display information from an external source, such as the computing system 405. For example, the client device 420 can receive one or more packets from the computing system 405 via the network 410 that include display information.

The client device 420 can send one or more requests to the computing device for display information, such as image data corresponding to a magnification, a coordinate, or other image parameter. The requests for display information transmitted by the client device 420 can include interaction information. For example, upon receiving an interaction (e.g., tap, click, drag, double-click, double-tap, etc.), the client device 420 can transmit a request that includes the interaction information. In some implementations, the client device 420 can process an interaction to translate or decode the type of interaction prior, and include the decoded interaction information in the request for display information. For example, the client device 420 can translate an interaction with a scroll bar as a request for display information that is not currently displayed (e.g., out of frame, etc.), or as a request to pan or move the current display information to a different position in the GUI of the client device 420. After transmitting the one or more requests for display information, the client device 420 can receive one or more responses from the computing system 405 that include the requested display information (e.g., one or more tiles of a biomedical image 450, one or more portions of a biomedical image 450, one or more operations performed on a biomedical image 450, etc.). In some implementations, the client device 420 can process the detected interactions and perform a corresponding desired operation on locally stored display information.

The data storage 415 can maintain one or more biomedical images 450. The biomedical image 450 can be received from one or more histopathological image preparers, such as a device configured to translate image data into a biomedical image 450 format. The biomedical images 450 can depict one or more portions of a tissue sample in one or more pixels. The pixels of each biomedical image 450 can contain one or more color channels that define an intensity of a corresponding color value at the coordinate of a pixel. In some implementations, the color channels of each pixel of the biomedical image 450 can be red, green, and blue (RGB) color channels. In some implementations, the color channel of each pixel in the biomedical image 450 can be cyan, yellow, magenta, and key (CYMK). In implementations where a biomedical image 450 is a grayscale image, each pixel can have a single color channel that corresponds to one of a black color intensity or a white color intensity.

In some embodiments, the biomedical image 450 may be generated or acquired in accordance with microscopy techniques or a histopathological image preparer, such as using an optical microscope, a confocal microscope, a fluorescence microscope, a phosphorescence microscope, an electron microscope, among others. The biomedical image 450 may be, for example, a histological section with a hematoxylin and eosin (H&E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The biomedical image 450 may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject.

The biomedical image 450 can be stored in any image format, such as PNG, JPEG, GIG, TIFF, PDF, RAW, SVS, or another format, such as an OpenSlide image. The biomedical image 450 can be stored in one or more indexed data structures in the data storage 415, and can be stored in association with various values, parameters, or other information, such as tile locations (e.g., portions being viewed or historical tile coordinate and size data, etc.), portion locations (e.g., locations and sizes of various portions of features of the biomedical image 450, etc.), color translation information (e.g., color operations that have been applied, color translation instructions, etc.), image source information (e.g., from what device was the biomedical image 450 received, etc.), annotation information (e.g., the annotation data 455, etc.). Each biomedical image 450 (and any corresponding or associated information) can be accessed, for example, by any of the components of the computing system 405, or any other computing device of the system 400, for example via the network 410 or by another suitable communications bus.

The annotation data 455 can be stored in the data storage 415, for example in association with the biomedical image 450. As described herein below, the components of the computing system 405 can generate annotation data 455 for the biomedical images 450. The annotation data 455 can include bitmap (BMP) information an identifier of a corresponding biomedical image 450. The bitmap information of the annotation data 455 can be configured such that each pixel in the bitmap corresponds to a pixel of the biomedical image 450. Thus, the bitmap information can provide pixel accurate annotations for the corresponding biomedical image 450. The pixels of the bitmap information can have a fixed bit width (e.g., 1-bit, 2-bits, 4-bits, 8-bits, 16-bits, 32-bits, etc.). The bit-width of the bitmap information can be selected such that the bitmap information can represent a desired amount of annotation data 455 without excessively utilizing computer storage resources. For example, for some biomedical images 450, the bit-width can be 4-bits wide, and thus sixteen distinct colors can be represented using the annotation information. Each color represented by the pixels in the bitmap can be defined or associated with respective information in a color table (e.g., a table that associates color information of a pixel (e.g., 0b0001) with rendering information (e.g., display as red, etc.) or other annotation related information. The color table can be stored in association with, or as a part of, the annotation data 455.

Tile identifier 425 can identify one or more tiles from a portion of a biomedical image 450. To identify the tiles from the portion of the biomedical image 450, the tile identifier 425 can access the data storage 415 to retrieve a biomedical image 450. In some implementations, the tile identifier 425 can receive the biomedical image 450 from another computing device, either via communications bus or via the network 410. From the biomedical image 450, the tile identifier 425 can identify a portion of the image that is being viewed or analyzed, or requested to be viewed, for example by an application executing on the computing system 405 or on the client device 420. The portion of the biomedical image 450 can be identified based on pixel coordinates of the center of the portion (e.g., the center of a location of interest in the biomedical image 450, etc.). The coordinates of the center of the portion or location of interest can be received, for example, from an application executing on the computing system 405 or on the client device 420. In some implementations, the coordinates can be default coordinates (e.g., if no coordinates received from the computing system 405 or the client device 420, use the coordinates of the center pixel of the biomedical image 450, etc.).

After the center of the portion or location of interest in the biomedical image 450 is identified, the tile identifier 425 can determine width and height information for the identified portion. For example, the width and height of the portion can correspond to a viewing window that is displayed or will be displayed in an application executing on the computing system 405 or the client device 420. The width and height of the portion can also correspond to a requested (e.g., by an application executing on the computing system 405 or the client device 420), or a default (e.g., 1×, etc.), magnification level of the portion of the biomedical image 450. The magnification level of the portion of the biomedical image 450 can correspond to an amount of a zoom operation that is applied to the portion of the biomedical image 450. Thus, at 1× magnification, the portion of biomedical image 450 can correspond to what would be visible if the identified coordinates of the portion of the biomedical image 450 were displayed in a viewing window of an application without any scaling operations applied. The tile identifier 425 can extract (e.g. copy to a different region of computer memory, etc.) the pixels of the biomedical image 450 that are determined as part of the identified portion of the biomedical image 450.

From the portion of the biomedical image 450, the tile identifier 425 can identify and extract one or more tiles that identify a subset of the biomedical image 450 at different levels of magnification. Thus, a tile can be one or more pixels within the identified portion of the biomedical image 450 that each have coordinates and widths that correspond to different resolutions or magnifications of the biomedical image 450. The number of tiles identified by the tile identifier 425 can be received, for example, from an application executing on the client device 420 or on the computing system 405. The number of tiles identified by the tile identifier 425 can be equal to a number of requested views received from the application executing on one of the computing system 405 or the client device 420. For example, the tile identifier 425 can receive a request for six different views of the identified portion of the biomedical image 450, and can then identify six corresponding tiles of the identified portion of the biomedical image 450, each having a requested magnification level. In some implementations, the tiles identified by the tile identifier 425 can be synchronized with the identified portion of the biomedical image 450. For example, each of the tiles can depict the same location of the biomedical image 450, but at different requested magnification levels.

Each magnification level (e.g., 0.5×, 1.0×, 1.1×, 1.5×, 2.5×, 5×, 10×, 15×, 20×, 30×, 40×, other magnifications, etc.) can correspond to a respective scale of a rendering of the biomedical image 450. For example, a biomedical image 450 (or any portions or tiles thereof, etc.) that is rendered at a 2× magnification can include the information of the biomedical image 450 rendered at twice the scale (e.g., each pixel replicated to match a double resolution version of the biomedical image 450, etc.). Because larger scale biomedical image 450 can unnecessarily occupy a large amount of storage space (e.g., only a small portion of the scaled up image is viewed at a given time, etc.), the tile identifier 425 can identify a tile or region that corresponds to a scaled-up viewing area for the biomedical image 450 around a desired coordinate. For example, a viewing window (or other GUI element, etc.) of a requesting application may be defined as having a certain dimension. In such a scenario, the tile identifier 425 can identify and extract a tile at a desired coordinate and having a number of pixels that corresponds to both the requested magnification factor and the display dimensions of the viewing window.

For example, a requested magnification tile that is synchronized to the coordinates of a viewed portion of the biomedical image 450 can be requested at an increased magnification level. Certain pathological analysis can be improved by having multiple views of the same biomedical image 450 at varying magnification levels. Thus, the tile identifier 425 can determine the dimension of the viewing window (e.g., or a region extending beyond the viewing window, such as a buffer region, etc.) into which the extracted tile will be inserted. By way of non-limiting example, consider the viewing window to have dimensions of 200 pixels by 200 pixels, although it should be understood that any size of viewing window is possible. If the request for a magnified tile at a coordinate corresponds to a 2× magnification, the tile identifier 425 can identify that a region of the unmagnified biomedical image 450 that is 100 pixels by 100 pixels should be extracted. The tile identifier 425 can then extract the 100 pixel by 100 pixel region of the biomedical image 450 with the viewing coordinate at the center of the tile. The identified and extracted pixels can then be provided to the display provider 430 for further processing.

Although an example case of a 2× magnification was described herein above, the tile identifier 425 can determine the number or region of pixels to extract for any given magnification. For example, each dimension of the requested viewing size (e.g., GUI element size or buffer size, etc.) may be divided by the magnification factor to arrive at the number of pixels in each dimension (e.g., number of pixels in x-dimension and number of pixels in y-dimension, etc.). In some implementations, the magnification factor can be less than 1× (for example, 0.5×). Further, it should be understood that the requested coordinate need not identify the center of the tile, and can instead identify any other position in the tile, such as the upper left corner, the upper right corner, the bottom right corner, or the bottom left corner, among others. The position in the tile to which the requested coordinate (e.g., within the biomedical medical image 450, etc.) corresponds can be indicated in the request.

The display provider 430 can provide the one or more tiles identified or extracted by the tile identifier 425 for concurrent display via corresponding GUI elements (e.g., a window, a frame, a viewing pane, or other region in a user interface that is capable of displaying one or more images, etc.). As mentioned above, pathological analysis can be improved by viewing a region of a biomedical image 450 at different magnifications concurrently, for example in various GUI elements. For example, one GUI element can be selected as a reference GUI element or a root GUI element, that may correspond to the first GUI element that views the biomedical image 450 when the biomedical image 450 is displayed, for example by the computing system 405 or the client device 420. The reference GUI element, or the application providing the GUI element, can include one or more actionable objects that can initiate a request for an additional GUI element that can include a request for a tile or a portion of the biomedical image 450 at a specified magnification factor and at a particular coordinate (e.g., synchronized with the coordinate of the reference GUI element displaying a portion of the biomedical image 450, another coordinate, etc.). This request can be provided by the application (e.g., executing on one of the client device 420 or the computing system 405, etc.) to the tile identifier 425 to identify one or more tiles of the biomedical image 450, as described herein above. The display provider 430 can receive the tiles from the tile identifier 425, and perform a scaling operation (e.g., double the size of the image for 2× magnification, etc.) on the tile to increase the resolution of the tile to match that of the requested GUI element. The display provider 430 can then transmit or otherwise provide the scaled tile to the application for display in a GUI element. In some implementations, the display provider 430 can generate instructions for the requesting application to instantiate the GUI element in the application, and render the corresponding tile in the GUI element. For example, if the GUI element is a new window, the corresponding tile can be displayed inside the window of the GUI element. In some implementations, the display provider 430 can change the format of the tile prior to providing the tile for display in the corresponding GUI element.

The interaction detector 435 can detect an interaction with a GUI element from the one or more displayed GUI elements. The interaction can occur at a client device 420 via which the GUI elements are displayed. The interaction can include a tap, a click, a drag, a double-click, a scroll operation, or a double-tap, among others. Certain interactions can include a requested operations, such as a pan operation or a zoom operation. To detect an interaction, the interaction detector 435 can implement one or more event or interaction listeners. The event or interaction listeners can monitor for interaction messages with the displayed GUI elements, and can return information about the interactions (e.g., coordinates, duration, type, etc.) as they occur. The interaction detector 435 can detect an interaction with an actionable object that corresponds with an operation to instantiate a new GUI element that displays a tile of the biomedical image 450 at a specified magnification level and coordinate.

Figure 5:
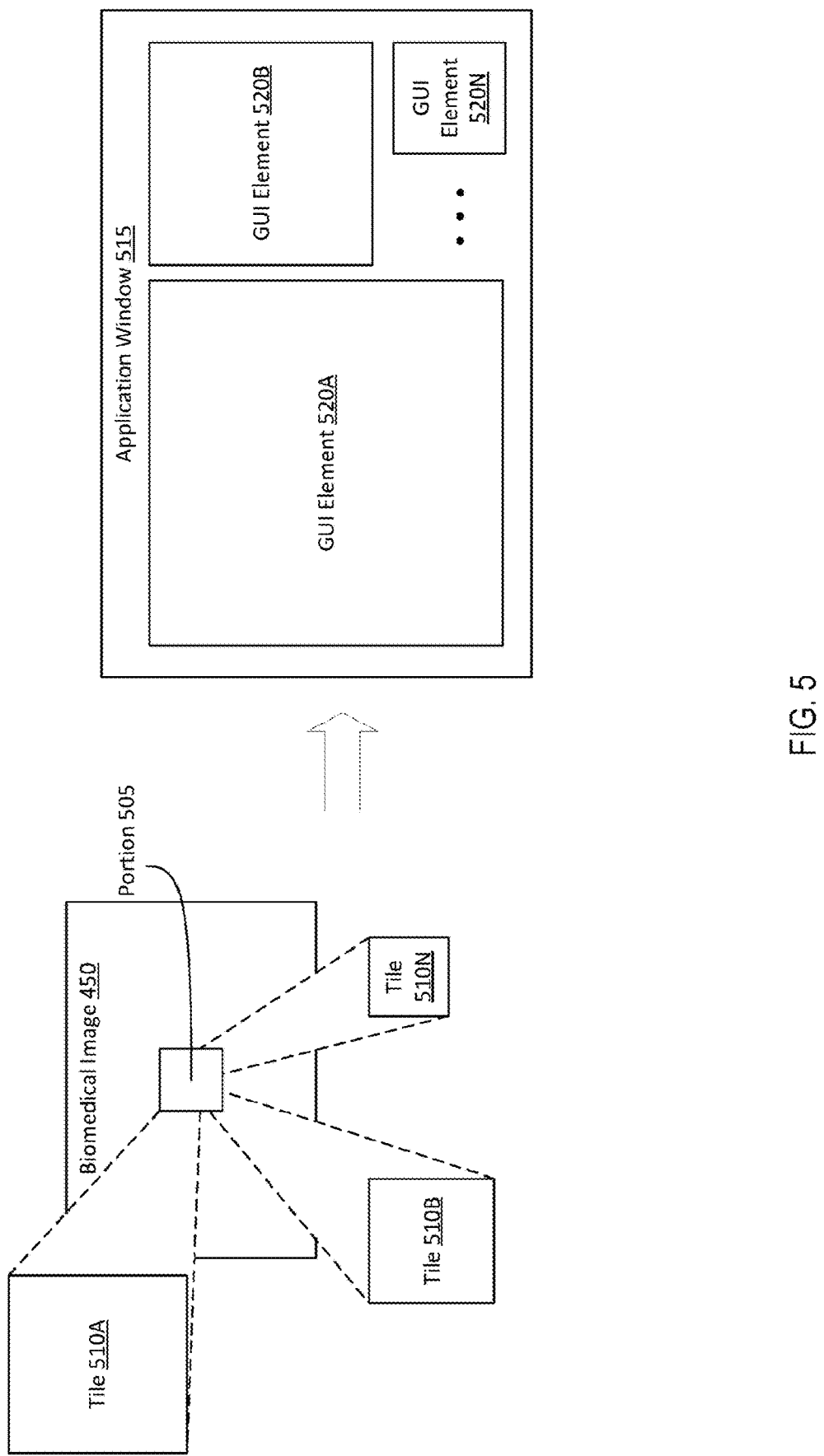
FIG. 5 depicts a block diagram representation of multiple tiles of a biomedical image and respective display regions in a graphical user interface, in accordance with an illustrative embodiment.

Referring briefly now to FIG. 5, depicted is a block diagram representation of multiple tiles of a biomedical image 450 and respective display regions in a graphical user interface, in accordance with an illustrative embodiment. As displayed in FIG. 5, a biomedical image 450 is shown with a corresponding identified portion 505. The portion can correspond, for example, to one of the displayed tiles in the application window 515. The identified portion can have corresponding coordinates (e.g., x and y coordinates within the biomedical image 450, etc.) and a corresponding width and height. Taken together, the coordinates and the width and the height of the portion 505 can represent a continuous region of pixels within the biomedical image 450. Describing further, it is shown that the tiles 510A-N (sometimes referred to generally as the tile(s) 510) are identified from the portion 505. As indicated by the scale (e.g., size relative to the other tiles 510) of the tiles 510, each tile can represent a different number of pixels in the biomedical image 450. Generally, a tile with more pixels occupies a larger area, and may indicate a lower magnification level than a tile with fewer pixels, if each tile is displayed within a GUI element of similar dimensions. Although only three tiles 510 are depicted in FIG. 5, it should be understood that any number of tiles can be identified from the biomedical image 450.

As shown in the right of FIG. 5, an application window 515 can include one or more GUI elements 520A-N (sometimes referred to generally as GUI element(s) 520). The application window 515 can be provided for display to the client device 420 accessing at least the portion 505 of the biomedical image 450. The application window 515 can receive one or more interactions, and may contain one or more actionable objects that indicate a type of operation to perform on the tiles 510. Each GUI element 520 can correspond to a respective tile 510 (e.g., GUI element 520A can correspond to tile 510A, GUI element 520B can correspond to tile 510B, etc.). Each GUI element can have a dimension (e.g., width and height, etc.), and one or more actionable objects to control the position or dimensions of the GUI element, or to dismiss the GUI element (e.g., stop the GUI element from displaying, etc.). In some implementations, a GUI element can have an actionable object corresponding to a minimize operation, that when interacted with, hides the display of the corresponding GUI element. Each GUI element can include a viewing portion that displays the tile to which the GUI element corresponds. In some implementations, one GUI element can be selected as a reference GUI element, and the tile displayed therein can be selected as a reference tile. The reference GUI element can be selected by one or more interactions with the GUI element, or with one or more actionable objects in the application window 515 that correspond to the respective GUI element.

Referring back now to FIG. 4, the interaction detector 435 can further detect one or more operations to perform on currently rendered GUI elements, such as a pan operation. A pan operation can indicate a request to view a different portion of the biomedical image 450 at a different coordinate but at the same level of magnification. For example, a pan operation can be provided in response a click and drag operation, a tap and drag operation, or an interaction with one or more actionable objects, such as a scrollbar. The interaction detector 435 can detect a zoom operation, or an operation to change the magnification of a tile rendered in a corresponding GUI element, among any other type of interaction described herein. The zoom operation can be detected in response to an interaction with an actionable object corresponding to the zoom operation, or by a click and drag operation with the GUI element, among any other type of interaction described herein. The interaction detector 435 can further detect a resize operation, which can change the size of the tile (e.g., number of pixels rendered relative to the corresponding tile coordinate, etc.) without changing the coordinates of the tile or the magnification level of the tile. A resize operation can be detected, for example, as a click and drag operation with the corner of the GUI element (e.g., resizing a GUI element can cause a corresponding operation request to resize the tile displayed therein, etc.). In some implementations, the interaction detector 435 can receive information about the interactions in one or more interaction messages from the client device 420. An operation to dismiss a GUI element can be detected by detecting an interaction with one or more actionable objects associated with a dismissal operation that correspond to that GUI element.

In response to an interaction indicating a pan or movement operation with a GUI element, the interaction detector 435 can identify a change in coordinates to apply to the tile displayed in the GUI element. A movement or pan operation can indicate that a different region of the biomedical image 450 is requested to be displayed at a particular magnification level in the corresponding GUI element. For example, a pan or move interaction can indicate a number of pixels (e.g., along the x-axis, the y-axis, or both), to move the coordinate of the displayed tile representing the biomedical image 450. From the current tile coordinates and the amount of change in tile coordinates, the interaction detector 435 can determine a new coordinate from which to identify the tile. In some implementations, the pan or move interaction can indicate a new coordinate in the biomedical image 450 from which to identify or extract the tile.

In response to an interaction indication a zoom operation with a GUI element, the interaction detector 435 can identify a change in the coordinates of the region from which to identify or extract the tile displayed in the GUI element. Prior to the zoom operation, a tile can represent a number of pixels of the biomedical image 450 at a first magnification level. If this magnification level is requested to be changed (e.g., in response to a zoom interaction, etc.) the interaction detector 435 can identify a number of pixels relative to the coordinate of the tile that should make up the tile at the requested magnification level. By way of non-limiting example, if the current magnification level is 2× and the tile represents a 100 pixel by 100 pixel region of the biomedical image 450, and a detected zoom operation requests the tile to be displayed at 4×, the interaction detector 435 can determine that the tile should comprise a 50 pixel by 50 pixel region of the biomedical image 450 at the requested zoom level. It should be understood that the interaction detector 435 can determine the number or region of pixels to extract for any change in magnification, for example by dividing each dimension of the requested viewing size (e.g., the GUI element size or buffer size, etc.) by the requested magnification factor to arrive at the number of pixels in each dimension (e.g., number of pixels in x-dimension and number of pixels in y-dimension, etc.) of the tile.

If one or more other tiles are synchronized to the tile identified by the pan or movement interaction, the tile modifier 440 can determine a corresponding change to apply to a the coordinates defining each of the synchronized tiles based on the change identified for the tile subject to the change in magnification or coordinates. In the case of a coordinate change to a first tile, the tile modifier 440 can determine that the coordinates of each of the other displayed tiles that are synchronized to the first tile as the new coordinates identified for the first tile by the interaction detector 435. In some implementations, all of the tiles are synchronized such that they all display the same coordinate of the biomedical image 450 at different magnifications. In some implementations, each tile can have its own independent coordinate and magnification level. In some implementations, only one tile (e.g., a reference tile) can receive pan, zoom, or other operations, and the other tiles are synchronized to the reference tile. In some other implementations, any tile can receive a move or zoom operation, and can be synchronized to any number of other tiles displayed in corresponding GUI elements. In the case of a zoom operation, the tile modifier 440 can determine a corresponding change in the magnification of other tiles that are zoom synchronized to each of the other tiles. Consider an example where there are two tiles in two synchronized GUI elements: one at a 2× magnification and one at a 4× magnification. If the 2× tile receives a request to double the magnification to 4×, the synchronized tile at 4× magnification can also be increased in tandem to 8× (e.g., double the magnification).

Using the new magnification level determined for each synchronized tile, the tile modifier 440 can determine a new region of the biomedical image 450 from which to identify and extract the pixels for each synchronized tile. The tile modifier 440 can determine the region represented by each tile by identifying the number of pixels to display in a rectangle relative to the tile coordinate (e.g., which is unchanged in the magnification operation). The tile modifier 440 can determine the number or region of pixels to extract for any change in magnification by dividing each dimension of the requested viewing size (e.g., the GUI element size or buffer size, etc.) by the requested magnification factor to arrive at the number of pixels in each dimension (e.g., number of pixels in x-dimension and number of pixels in y-dimension, etc.) of the tile. It should be understood that a tile that is synchronized to another tile for the purposes of position (e.g., synchronized to the same coordinate in the biomedical image 450) are not necessarily synchronized to the same magnification level, and vice versa. Synchronization between tiles can be indicated or assigned, for example, via one or more actionable objects in the application presenting the GUI elements, or by one or more default configurations.

The display provider 430 can use the new coordinates and regions identified for each tile to update the display of the tiles in the corresponding GUI elements. The display provider 430 can extract the pixels of the requested regions (e.g., the newly identified coordinates and pixels) of the tiles that are to be updated (e.g., that are subject to an operation or are synchronized to a tile that is subject to an operation, etc.) from the biomedical image 450. After extracting the new pixels for each tile from the biomedical image 450, the display provider 430 can perform a scaling operation (e.g., double the size of the image for 2× magnification, etc.) on each tile to increase the resolution of the tile to match that of the corresponding GUI element. The display provider 430 can then transmit or otherwise provide the scaled tile to the application for display in the GUI element. In some implementations, the display provider 430 can generate instructions for the requesting application to update the tiles displayed in each GUI element with the newly extracted and scaled tiles, and render the corresponding updated tile in the GUI elements.

Figure 6:
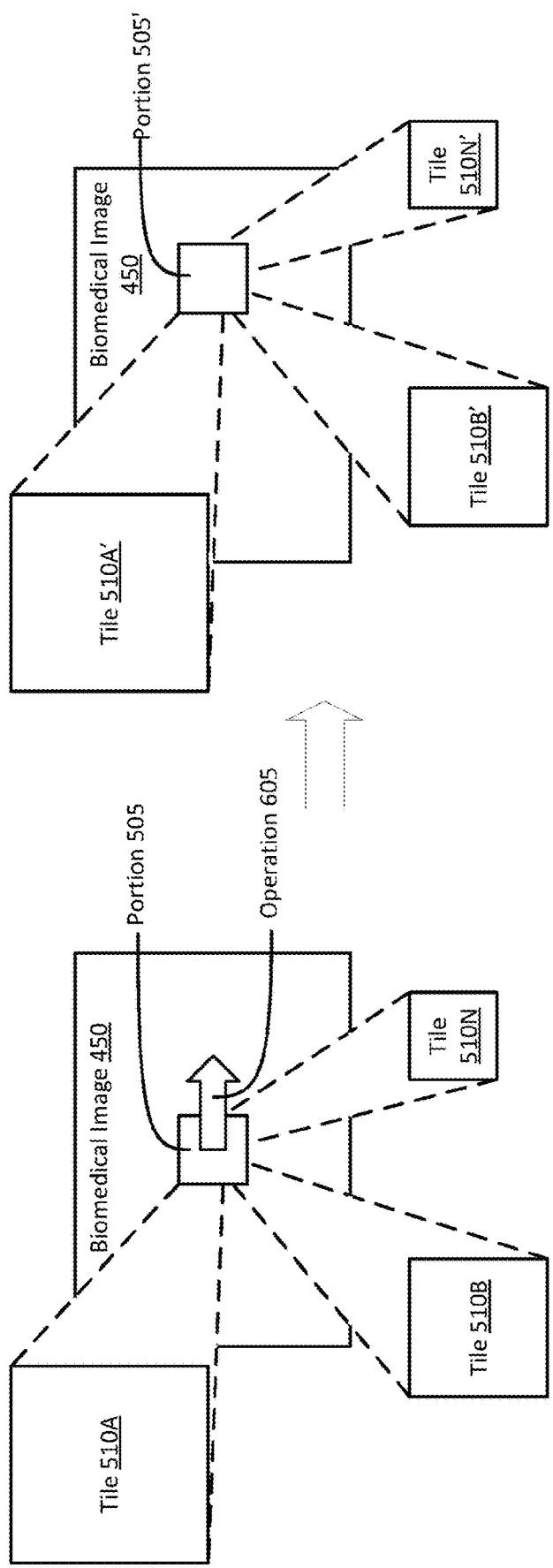
FIG. 6 depicts a block diagram of a change in one or more tiles of a biomedical image that is undergoing a panning or zoom operation, in accordance with an illustrative embodiment.

Referring briefly now to FIG. 6, depicted is a block diagram of a change in one or more tiles of a biomedical image 450 that is undergoing a panning or zoom operation, in accordance with an illustrative embodiment. As shown, at least one of the tiles 510 is subject to a panning operation. 605. The panning operation shown in FIG. 6 indicates a coordinate change of an increase along the x-axis for the tiles that make up the portion 505 in the biomedical image 450. Because each of the tiles 510 are synchronized to one another, the pixel data from each of the tiles can be retrieved from the new position of the portion of the biomedical image 450, but at the same magnification. Thus, the portion of the biomedical image 450 has a change in coordinate and occupies a different portion 505' of the biomedical image 450. As all of the tiles are synchronized to the new position, each of the tiles 510 are changed such that they comprise the pixels of the different portion 505' instead of the portion 505, and are thus updated to become the updated tiles 510'. Each of the updated tiles 510' can be provided for display in corresponding GUI elements.

Referring back now to FIG. 4, in some implementations, prior to providing the tiles for display in corresponding GUI elements, the tile modifier 440 can apply a color modification operation (sometimes herein called a false color representation or a color correction) on the a portion of a biomedical image 450 corresponding to each tile, while maintaining a remaining portion of the biomedical image 450 without the color modification. Biomedical image 450 can be captured from a variety of different capture devices. However, different capture devices may have different color parameters or values than other capture devices. For ease of analysis, it is advantageous to represent and display biomedical image 450s in a single color space, such that images of a tissue sample captured using a first capture device have colors that match those of images captured of the tissue sample using a second capture device. To correct for any type of color inconsistency, the tile modifier 440 can select a color modification option for the tiles of the biomedical image 450. A color modification option can include one or more color compensation factors (e.g., values that can be added to or multiplied by the color channel intensity values in each pixel) that can be applied to the pixels in a biomedical image 450 to alter the colors in the image.

In some implementations, the selection of the color modification option can correspond to the source of the biomedical image 450 (e.g., the capture device used to capture the biomedical image 450). For example, a biomedical image 450 can be stored in the data storage 415 in association with an identifier of the capture device used to generate the biomedical image 450. To identify the source of the biomedical image 450, the tile modifier 440 can access the data storage 415 to retrieve the identifier of the capture device stored in association with the biomedical image 450. Using the identifier, the tile modifier 440 can retrieve and select a color modification option that corresponds to the identifier from the data storage 415. In some implementations, the color option can be manually selected or applied through input received from one or more actionable objects.

The tile modifier 440 can then apply the selected color option to the portions of the biomedical image 450 that correspond to one or more the tiles identified by the components of the computing system 405. For example, the tile modifier 440 can access the pixels of the biomedical image 450 that correspond to the regions of the biomedical image 450 that are used to construct the tiles. The tile modifier 440 can use the color compensation factors in the selected color modification to change one or more color channel intensity values for each pixel in the identified regions. In some implementations, the tile modifier 440 can multiply the color channel intensity values in each pixel by one or more color compensation values (e.g., one for each color intensity value in the pixel). In some implementations, the tile modifier 440 can add the color compensation values to the corresponding one or more color channel intensity values in each pixel. Thus, the tile modifier 440 can generate one or more portions of the biomedical image 450 having corrected colors. The color-corrected portions of the biomedical image 450 can then be used to construct one or more tiles as described herein above to generate color-corrected tiles. Once the color-corrected tiles are constructed, the display provider 430 can update (e.g., replace the display of the tiles in the GUI elements, etc.) the corresponding GUI elements to display the color corrected tiles.

Figure 7:
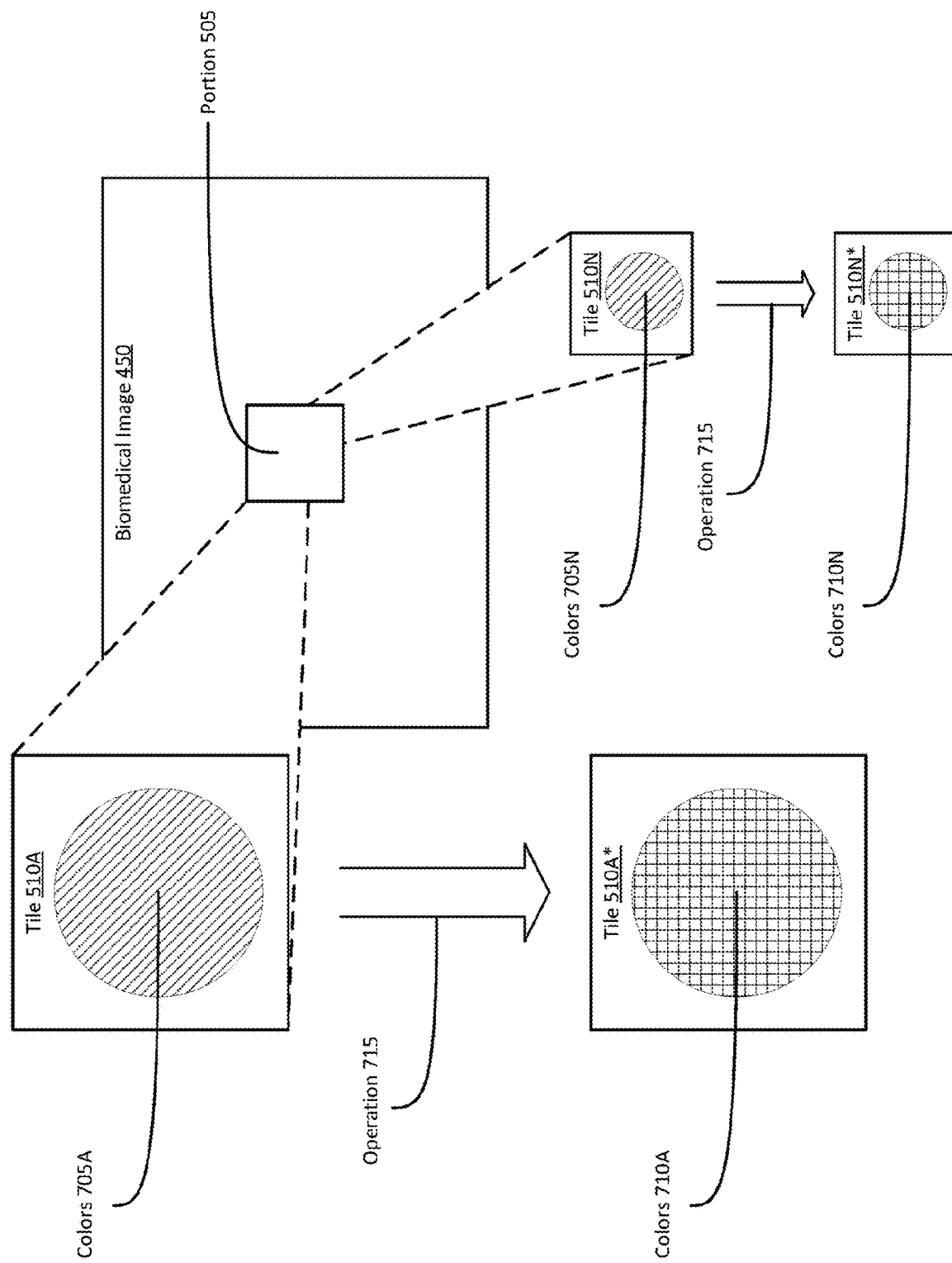
FIG. 7 depicts a block diagram of one or more tiles of a biomedical image that is undergoing a color change operation, in accordance with an illustrative embodiment.

Referring briefly now to FIG. 7, depicted is a block diagram of one or more tiles of a biomedical image 450 that is undergoing a color change operation, in accordance with an illustrative embodiment. As shown in FIG. 7, each of the tiles 510 depict a shape at a first color prior to the color correction procedure. Also, as shown, each of the tiles 510 correspond to (e.g., are synchronized) to the same portion of the biomedical image 450 at different magnification levels. The operation 715 indicates a color change operation, which can include performing one or more transformations (e.g., multiplication, addition, etc.) on the color values of present in the portion of the biomedical image 450 corresponding to the tiles 510. Thus, as depicted in FIG. 7, each of the tiles 510 are updated by the color correcting operation 715 to become updated tiles 510*, displaying a color-corrected portion of the biomedical image 450 at different magnifications. Because each of the tiles 510 are synchronized, they depict a substantially similar portion of the biomedical image 450, but at different magnifications. Thus, color-corrected pixels that are displayed in one tile 510A* are also displayed at least in the other synchronized color-corrected tiles 510N*.

Referring back now to FIG. 4, the interaction detector 435 can identify an annotation from GUI element. The annotation can identify one or more pixel coordinates of the tile displayed in the corresponding GUI element that is to be annotated. For example, certain interactions with the GUI elements can indicate an annotation at a particular coordinate in the biomedical image 450. Annotations are useful to pathological analysis, because an annotation can be used to indicate the presence of a conditions of interest in an area on the tissue sample represented in the biomedical image 450. Because features that might indicate a condition of interest may be small, it is advantageous for a system to annotate biomedical image 450s on a pixel-by-pixel basis. Thus, the interaction detector 435 can detect a pixel location (e.g., x-coordinate and y-coordinate, etc.) of a pixel in a tile displayed in a GUI element that is to be annotated. The coordinates of the received annotation can then be mapped by the interaction detector 435 to a corresponding position of a pixel in the biomedical image 450. For example, consider a biomedical image 450 that is 200 pixels by 200 pixels, and a tile that represents pixels from coordinate 100 to 149 in the biomedical image 450 on the x-axis, and pixels from coordinate 100 to 149 on the y-axis. In this example, the tile as dimensions of 50 pixels by 50 pixels. If an annotation is detected a the coordinate 3 on the x axis of the tile, and coordinate 5 on the y axis of tile, the interaction identifier can map the annotation to pixel coordinate 103 on the x-axis and 105 on the y-axis in the biomedical image 450.

Upon mapping the location of an annotation, the tile modifier 440 can store color data at the mapped pixel coordinate in the annotation data 455. The annotation data 455 can have dimensions that are equal to that of the biomedical image 450, and can be stored with an identifier of the corresponding biomedical image 450. Thus, the annotation data 455 that corresponds to a biomedical image 450 can have a one-to-one pixel mapping with the corresponding biomedical image 450. The annotation data 455 can have a fixed bit-width for each pixel in the annotation data 455. When the interaction detector 435 identifies an annotation, the annotation can be associated with a corresponding color or pixel value (e.g., a bit string value of a fixed width, etc.). The color value can be manually selected, or may be automatically selected based on a default configuration. Each selectable color value can correspond to a color identified in a color map that can be stored in association with the annotation data 455 in the data storage 415.

The color map can associate color value that can be represented by the annotation data 455 (e.g., bit string values of a fixed width, etc.) with a display color (e.g., full RGB color channel pixel value, etc.). Thus, the color map for the annotation data 455 can serve as a lookup table for pixel color values that correspond to each possible annotation value. For example, if each pixel in the annotation data 455 is represented by a 4-bit wide bit string, the color map can have fifteen different colors that each correspond to one of the possible values of the 4-bit pixel, and one color that corresponds to an absence of an annotation (e.g., 0b0000, etc.). The color map for the annotation data 455 can be automatically generated based on a default configuration, or can be specified manually through one or more GUI elements or actionable objects. In some embodiments, the color value may be represented using a indexed color value The indexed color value may include a value (e.g., a bit or digit) corresponding to a respective color for the annotation. For example, the color values for the annotations may be represented with 4 bits, with the bit word "0000" representing the color red, "1100" representing the color green," and "0100" representing the color yellow for the annotation.

Using the color map and the annotation data 455, the display provider 430 can update the tiles displayed in the one or more GUI elements to indicate the annotation. In some implementations, annotations can be displayed as a separate layer on top of the biomedical image 450. The visibility of the annotation layer can be toggled, for example, by one or more actionable objects in each GUI element. For example, each GUI element may be associated with a "show annotations" button, a "hide annotations" button, or a "toggle annotations" button. Note that the labels and type of the actionable objects are for example purposes only, and should be not be construed as a limiting. When the display provider 430 receives an indication to display the annotation information, the display provider 430 can access the annotation data 455 and the corresponding color map to identify colors to annotate. Thus, when selecting pixels to form the tiles for a particular portion of the display information, the display provider 430 can determine if an annotation is present at each corresponding pixel location in the tile. If annotation data 455 is present at the coordinates of the pixel, the display provider 430 can modify the corresponding pixel in the tile to have color channel values that are equal to the color channel values in the color map for the annotation data 455 at that pixel. Likewise, as the annotation data 455 is updated by the interaction detector 435, the display provider 430 can update corresponding pixels in synchronized tiles such that they display up-to-date annotation information in real-time. The display provider 430 can then provide the updated tiles for display in the one or more GUI elements, as described herein above.

Figure 8:
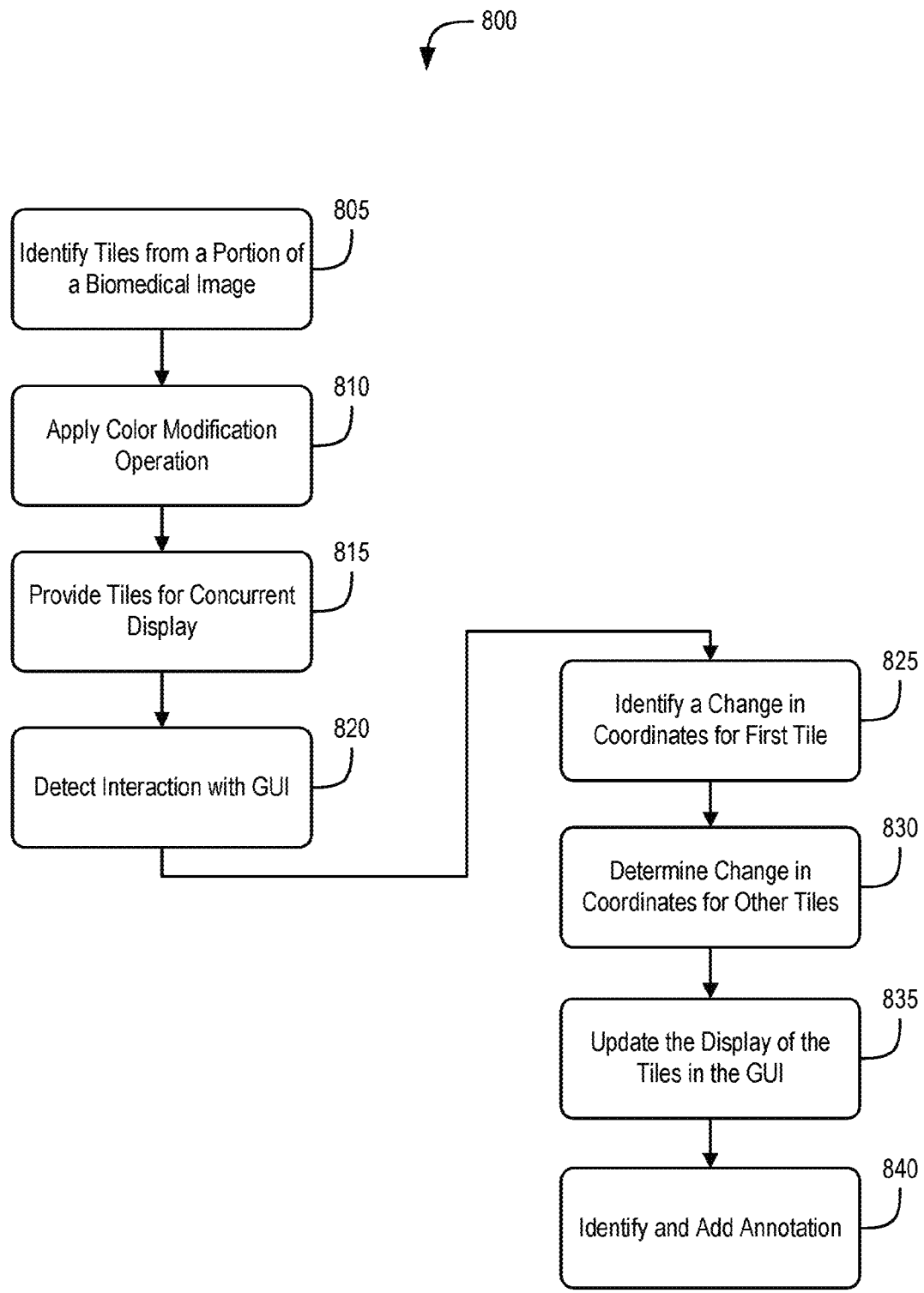
FIG. 8 depicts a flow diagram of an example method of providing multiple views of a biomedical image for concurrent display, in accordance with an illustrative embodiment.

Referring now to FIG. 8, depicted is an example flow diagram of a method 800 for providing multiple views of a biomedical image for concurrent display, in accordance with an illustrative embodiment. The method 800 can be performed, for example, by any of the computing systems described herein, including the computing system 405, the server system 900, or the client computer system 914, among others. In brief overview, the computing system (e.g. the computing system 405, etc.) can identify tiles from a portion of a biomedical image (STEP 805), apply a color modification operation 810 (STEP 810), provide the tiles for concurrent display (STEP 815), detect an interaction with the a GUI element (STEP 820), identify a change in coordinates for a first tile (STEP 825), determine a change in coordinates for other tiles (STEP 830), update the display of the tiles in the GUI (STEP 835), and identify and add one or more annotations (STEP 840).

In further detail, the computing system (e.g., the computing system 405) can identify tiles from a portion of a biomedical image (e.g., the biomedical image 450, etc.) (STEP 805). To identify tiles of the biomedical image 450, the computing system can access the data storage (e.g., the data storage 415, etc.) to retrieve a biomedical image. In some implementations, the computing system can receive the biomedical image from another computing system, either via communications bus or via a network (e.g., the network 410, etc.). From the biomedical image, the computing system can identify a portion of the image that is being viewed or analyzed, or requested to be viewed, for example by an application executing on the computing system or on a client device (e.g., the client device 420, etc.) in communication with the computing system. The portion can be identified using pixel coordinates at the center of the portion (e.g., the center of a location of interest, etc.). The coordinates can be received, for example, from an application executing on the computing system. In some implementations, the coordinates can be default coordinates (e.g., if no coordinates received from the application, use the coordinates of the center pixel of the biomedical image, etc.).

After the center (e.g., or other identifying coordinates, etc.) of the portion or location of interest are identified, the tile identifier 425 can determine width and height information for the identified portion. The width and height of the portion can correspond to a viewing window that is displayed or will be displayed in an application executing on the computing system. The width and height of the portion can also correspond to a requested (e.g., by the application executing on the computing system), or a default (e.g., 1×, etc.), magnification level of the portion of biomedical image 450. The magnification level of the portion of biomedical image 450 can correspond to an amount of a zoom operation that is applied to the biomedical image 450. Thus, at 1× magnification, the portion of biomedical image can correspond to what would be visible if the identified coordinates of the biomedical image were displayed in a viewing window of an application with any scaling operations applied. The computing system can extract (e.g. copy to a different region of computer memory, etc.) the pixels of the biomedical image that are determined as part of the identified portion of the biomedical image.

From the portion of the biomedical image, the computing system can identify and extract one or more tiles that identify a subset of the biomedical image at different levels of magnification. A tile can be one or more pixels within the identified portion of the biomedical image that each have coordinates and widths that correspond to different resolutions or magnifications of the biomedical image. The number of tiles identified by the computing system can be received, for example, from an application executing on the computing system or from a client device. The number of tiles identified by the computing system can be equal to a number of requested views received from the application. For example, the computing system can receive a request for six different views of the identified portion of the biomedical image, and can then identify six corresponding tiles of the identified portion of the biomedical image, each having a requested magnification level. In some implementations, the tiles can be synchronized with the identified portion of the biomedical image. For example, each of the tiles can depict the same location of the biomedical image, but at different requested magnification levels. The computing system can identify and extract a tile at a desired coordinate and having a number of pixels that corresponds to both the requested magnification factor and the display dimensions of the viewing window.

The computing system can apply a color modification operation 810 (STEP 810). The computing system can select a color modification option for the tiles of the biomedical image. A color modification option can include one or more color compensation factors (e.g., values that can be added to or multiplied by the color channel intensity values in each pixel) that can be applied to the pixels in a biomedical image to alter its pixel colors. In some implementations, the selection of the color modification option can correspond to the source of the biomedical image (e.g., the capture device used to capture the biomedical image). S biomedical image can be stored in the data storage in association with an identifier of the capture device used to generate the biomedical image. To identify the source of the biomedical image, the computing system can access the data storage to retrieve the identifier of the capture device stored in association with the biomedical image. Using the identifier, the computing system can retrieve and select a color modification option that corresponds to the identifier from the data storage. In some implementations, the color option can be manually selected or applied through input received from one or more actionable objects.

The computing system can then apply the selected color option to the portions of the biomedical image that correspond to one or more the tiles identified by the computing system. For example, the computing system can access the pixels of the biomedical image that correspond to the regions of the biomedical image that are used to construct the tiles. The computing system can use the color compensation factors in the selected color modification to change one or more color channel intensity values for each pixel in the identified regions. In some implementations, the computing system can multiply the color channel intensity values in each pixel by one or more color compensation values (e.g., one for each color intensity value in the pixel). In some implementations, the computing system can add the color compensation values to the corresponding one or more color channel intensity values in each pixel. Thus, the computing system can generate one or more portions of the biomedical image having corrected colors. The color-corrected portions of the biomedical image can then be used to construct one or more tiles as described herein above to generate color-corrected tiles.

The computing system can provide the tiles for concurrent display in one or more GUI elements (STEP 815). For example, one GUI element can be selected as a reference GUI element or a root GUI element that may correspond to the first GUI element that views the biomedical image when the biomedical image is displayed. The reference GUI element, or the application providing the GUI element, can include one or more actionable objects that can initiate a request for an additional GUI element that can include a request for a tile or a portion of the biomedical image at a specified magnification factor and at a particular coordinate. This request can be provided by the application to the computing system to identify one or more tiles of the biomedical image, as described herein above (e.g., the color-corrected tiles, etc.). The computing system can receive the tiles from the computing system, and perform a scaling operation (e.g., double the size of the image for 2× magnification, etc.) on the tile to increase the resolution of the tile to match that of the requested GUI element. The computing system can then transmit or otherwise provide the scaled tile to the application for display in a GUI element. In some implementations, the computing system can generate instructions for the requesting application to instantiate the GUI element in the application, and render the corresponding tile in the GUI element.

The computing system can detect an interaction with a GUI element (STEP 820). An interaction can include a tap, a click, a drag, a double-click, a scroll operation, or a double-tap, among others. Certain interactions can include a requested operations, such as a pan operation or a zoom operation. To detect an interaction, the computing system can implement one or more event or interaction listeners. The event or interaction listeners can monitor for interaction messages with the displayed GUI elements, and can return information about the interactions (e.g., coordinates, duration, type, etc.) as they occur. The computing system can detect an interaction with an actionable object that corresponds with an operation to instantiate a new GUI element that displays a tile of the biomedical image at a specified magnification level and coordinate.

The computing system can further detect one or more operations to perform on currently rendered GUI elements, such as a pan operation. A pan operation can indicate a request to view a different portion of the biomedical image at a different coordinate but at the same level of magnification. For example, a pan operation can be provided in response a click and drag operation, a tap and drag operation, or an interaction with one or more actionable objects, such as a scrollbar. The computing system can detect a zoom operation, or an operation to change the magnification of a tile rendered in a corresponding GUI element, among any other type of interaction described herein. The zoom operation can be detected in response to an interaction with an actionable object corresponding to the zoom operation, or by a click and drag operation with the GUI element, among any other type of interaction described herein. The computing system can further detect a resize operation, which can change the size of the tile (e.g., number of pixels rendered relative to the corresponding tile coordinate, etc.) without changing the coordinates of the tile or the magnification level of the tile. A resize operation can be detected, for example, as a click and drag operation with the corner of the GUI element (e.g., resizing a GUI element can cause a corresponding operation request to resize the tile displayed therein, etc.). In some implementations, the computing system can receive information about the interactions in one or more interaction messages (e.g., from the application presenting the GUI elements, etc.).

The computing system can identify a change in coordinates for a first tile (STEP 825). A movement or pan operation can indicate that a different region of the biomedical image is requested to be displayed at a particular magnification level in the corresponding GUI element. For example, a pan or move interaction can indicate a number of pixels (e.g., along the x-axis, the y-axis, or both), to move the coordinate of the displayed tile representing the biomedical image. From the current tile coordinates and the amount of change in tile coordinates, the computing system can determine a new coordinate from which to identify the tile. In some implementations, the pan or move interaction can indicate a new coordinate in the biomedical image from which to identify or extract the tile.

The computing system can determine a change in coordinates for other tiles (STEP 830). If one or more other tiles are synchronized to the tile identified by the pan or movement interaction, the computing system can determine a corresponding change to apply to a the coordinates defining each of the synchronized tiles based on the change identified for the tile subject to the change in magnification or coordinates. In the case of a coordinate change to a first tile, the computing system can determine that the coordinates of each of the other displayed tiles that are synchronized to the first tile as the new coordinates identified for the first tile by the interaction detector 435. In some implementations, all of the tiles are synchronized such that they all display the same coordinate of the biomedical image at different magnifications. In some implementations, each tile can have its own independent coordinate and magnification level. In some implementations, only one tile (e.g., a reference tile) can receive pan, zoom, or other operations, and the other tiles are synchronized to the reference tile. In some other implementations, any tile can receive a move or zoom operation, and can be synchronized to any number of other tiles displayed in corresponding GUI elements.

The computing system can update the display of the tiles in the GUI (STEP 835). The computing system can extract the pixels of the requested regions (e.g., the newly identified coordinates and pixels) of the tiles that are to be updated (e.g., that are subject to an operation or are synchronized to a tile that is subject to an operation, etc.) from the biomedical image. After extracting the new pixels for each tile from the biomedical image, the computing system can perform a scaling operation (e.g., double the size of the image for 2× magnification, etc.) on each tile to increase the resolution of the tile to match that of the corresponding GUI element. The computing system can then transmit or otherwise provide the scaled tile to the application for display in the GUI element. In some implementations, the computing system can generate instructions for the requesting application to update the tiles displayed in each GUI element with the newly extracted and scaled tiles, and render the corresponding updated tile in the GUI elements.

The computing system can identify and add one or more annotations (STEP 840). The computing system can detect a pixel location (e.g., x-coordinate and y-coordinate, etc.) of a pixel in a tile displayed in a GUI element that is to be annotated (e.g., via a detected interaction, etc.). The coordinates of the received annotation can then be mapped by the interaction detector 435 to a corresponding position of a pixel in the biomedical image. For example, consider a biomedical image that is 200 pixels by 200 pixels, and a tile that represents pixels from coordinate 100 to 149 in the biomedical image on the x-axis, and pixels from coordinate 100 to 149 on the y-axis. In this example, the tile as dimensions of 50 pixels by 50 pixels. If an annotation is detected a the coordinate 3 on the x axis of the tile, and coordinate 5 on the y axis of tile, the computing system can map the annotation to pixel coordinate 103 on the x-axis and 105 on the y-axis in the biomedical image.

Upon mapping the location of an annotation, the computing system can store color data at the mapped pixel coordinate in the annotation data (e.g., the annotation data 455). The annotation data can correspond to a biomedical image in a one-to-one pixel mapping. The annotation data can have a fixed bit-width for each pixel in the annotation data. When the computing system identifies an annotation, the annotation can be associated with a corresponding color or pixel value (e.g., a bit string value of a fixed width, etc.). The color value can be manually selected, or may be automatically selected based on a default configuration. Each selectable color value can correspond to a color identified in a color map that can be stored in association with the annotation data. The color map can associate color value that can be represented by the annotation data (e.g., bit string values of a fixed width, etc.) with a display color (e.g., full RGB color channel pixel value, etc.). Thus, the color map for the annotation data can serve as a lookup table for pixel color values that correspond to each possible annotation value. For example, if each pixel in the annotation data is represented by a 4-bit wide bit string, the color map can have fifteen different colors that each correspond to one of the possible values of the 4-bit pixel, and one color that corresponds to an absence of an annotation (e.g., 0b0000, etc.). The color map for the annotation data can be automatically generated based on a default configuration, or can be specified manually through one or more GUI elements or actionable objects.

Using the color map and the annotation data, the computing system can update the tiles displayed in the one or more GUI elements to indicate the annotation. In some implementations, annotations can be displayed as a separate layer on top of the biomedical image. The visibility of the annotation layer can be toggled, for example, by one or more actionable objects in each GUI element. When the computing system receives an indication to display the annotation information, the computing system can access the annotation data and the corresponding color map to identify colors to annotate. Thus, when selecting pixels to form the tiles for a particular portion of the display information, the computing system can determine if an annotation is present at each corresponding pixel location in the tile. If annotation data is present at the coordinates of the pixel, the computing system can modify the corresponding pixel in the tile to have color channel values that are equal to the color channel values in the color map for the annotation data at that pixel. Likewise, as the annotation data is updated by the computing system, the computing system can update corresponding pixels in synchronized tiles such that they display up-to-date annotation information in real-time. The computing system can then provide the updated tiles for display in the one or more GUI elements, as described herein above.

C. Computing and Network Environment

Various operations described herein can be implemented on computer systems. FIG. 9 shows a simplified block diagram of a representative server system 900, client computer system 914, and network 929 usable to implement certain embodiments of the present disclosure. In various embodiments, server system 900 or similar systems can implement services or servers described herein or portions thereof. Client computer system 914 or similar systems can implement clients described herein. The system 400 described herein can be similar to the server system 900. Server system 900 can have a modular design that incorporates a number of modules 902 (e.g., blades in a blade server embodiment); while two modules 902 are shown, any number can be provided. Each module 902 can include processing unit(s) 904 and local storage 906.

Processing unit(s) 904 can include a single processor, which can have one or more cores, or multiple processors. In some embodiments, processing unit(s) 904 can include a general-purpose primary processor as well as one or more special-purpose co-processors such as graphics processors, digital signal processors, or the like. In some embodiments, some or all processing units 904 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 904 can execute instructions stored in local storage 906. Any type of processors in any combination can be included in processing unit(s) 904.

Local storage 906 can include volatile storage media (e.g., DRAM, SRAM, SDRAM, or the like) and/or non-volatile storage media (e.g., magnetic or optical disk, flash memory, or the like). Storage media incorporated in local storage 906 can be fixed, removable or upgradeable as desired. Local storage 906 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 904 need at runtime. The ROM can store static data and instructions that are needed by processing unit(s) 904. The permanent storage device can be a non-volatile read-and-write memory device that can store instructions and data even when module 902 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 906 can store one or more software programs to be executed by processing unit(s) 904, such as an operating system and/or programs implementing various server functions such as functions of the system 400 of FIG. 4 or any other system described herein, or any other server(s) associated with system 400 or any other system described herein.

"Software" refers generally to sequences of instructions that, when executed by processing unit(s) 904 cause server system 900 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 904. Software can be implemented as a single program or a collection of separate programs or program modules that interact as desired. From local storage 906 (or non-local storage described below), processing unit(s) 904 can retrieve program instructions to execute and data to process in order to execute various operations described above.

In some server systems 900, multiple modules 902 can be interconnected via a bus or other interconnect 908, forming a local area network that supports communication between modules 902 and other components of server system 900. Interconnect 908 can be implemented using various technologies including server racks, hubs, routers, etc.

A wide area network (WAN) interface 910 can provide data communication capability between the local area network (interconnect 908) and the network 929, such as the Internet. Technologies can be used, including wired (e.g., Ethernet, IEEE 802.3 standards) and/or wireless technologies (e.g., Wi-Fi, IEEE 802.11 standards).

In some embodiments, local storage 906 is intended to provide working memory for processing unit(s) 904, providing fast access to programs and/or data to be processed while reducing traffic on interconnect 908. Storage for larger quantities of data can be provided on the local area network by one or more mass storage subsystems 912 that can be connected to interconnect 908. Mass storage subsystem 912 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 912. In some embodiments, additional data storage resources may be accessible via WAN interface 910 (potentially with increased latency).

Server system 900 can operate in response to requests received via WAN interface 910. For example, one of modules 902 can implement a supervisory function and assign discrete tasks to other modules 902 in response to received requests. Work allocation techniques can be used. As requests are processed, results can be returned to the requester via WAN interface 910. Such operation can generally be automated. Further, in some embodiments, WAN interface 910 can connect multiple server systems 900 to each other, providing scalable systems capable of managing high volumes of activity. Other techniques for managing server systems and server farms (collections of server systems that cooperate) can be used, including dynamic resource allocation and reallocation.

Server system 900 can interact with various user-owned or user-operated devices via a wide-area network such as the Internet. An example of a user-operated device is shown in FIG. 9 as client computing system 914. Client computing system 914 can be implemented, for example, as a consumer device such as a smartphone, other mobile phone, tablet computer, wearable computing device (e.g., smart watch, eyeglasses), desktop computer, laptop computer, and so on.

For example, client computing system 914 can communicate via WAN interface 910. Client computing system 914 can include computer components such as processing unit(s) 916, storage device 918, network interface 920, user input device 922, and user output device 924. Client computing system 914 can be a computing device implemented in a variety of form factors, such as a desktop computer, laptop computer, tablet computer, smartphone, other mobile computing device, wearable computing device, or the like.

Processor 916 and storage device 918 can be similar to processing unit(s) 904 and local storage 906 described above. Suitable devices can be selected based on the demands to be placed on client computing system 914; for example, client computing system 914 can be implemented as a "thin" client with limited processing capability or as a high-powered computing device. Client computing system 914 can be provisioned with program code executable by processing unit(s) 916 to enable various interactions with server system 900.

Network interface 920 can provide a connection to the network 929, such as a wide area network (e.g., the Internet) to which WAN interface 910 of server system 900 is also connected. In various embodiments, network interface 920 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 922 can include any device (or devices) via which a user can provide signals to client computing system 914; client computing system 914 can interpret the signals as indicative of particular user requests or information. In various embodiments, user input device 922 can include any or all of a keyboard, touch pad, touch screen, mouse or other pointing device, scroll wheel, click wheel, dial, button, switch, keypad, microphone, and so on.

User output device 924 can include any device via which client computing system 914 can provide information to a user. For example, user output device 924 can include a display to display images generated by or delivered to client computing system 914. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that functions as both input and output device. In some embodiments, other user output devices 924 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 904 and 916 can provide various functionality for server system 900 and client computing system 914, including any of the functionality described herein as being performed by a server or client, or other functionality.

It will be appreciated that server system 900 and client computing system 914 are illustrative and that variations and modifications are possible. Computer systems used in connection with embodiments of the present disclosure can have other capabilities not specifically described here. Further, while server system 900 and client computing system 914 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method for generating a preamble, comprising:

identifying, by a computing system, a plurality of tiles from a first portion of a biomedical image that is derived from a tissue sample on a slide via a histopathological image preparer, each tile of the plurality of tiles acquired at one of a plurality of magnification factors and defined by a respective corresponding set of coordinates within a same biomedical image, at least one of the plurality of tiles corresponding to at least a subset of the first portion of the same biomedical image that is derived from a same tissue sample on the slide, each tile individually responsive to a move or zoom operation via a corresponding graphical user interface (GUI) element and synchronizable to others of the plurality of tiles simultaneously displayed in corresponding GUI elements;

providing, by the computing system, the plurality of tiles for concurrent display via a corresponding plurality of graphical user interface (GUI) elements;

detecting, by the computing system, an interaction with a GUI element from the plurality of GUI elements to modify presentation of one tile of the plurality of tiles;

identifying, by the computing system, a first change to a first set of corresponding coordinates defining the one tile in response to the interaction with the GUI element;

determining, by the computing system, a second change to apply to a second set of coordinates defining another of a remainder of the plurality of tiles based on the first change to the first set of coordinates; and updating, by the computing system, the displaying of the plurality of tiles in the corresponding plurality of GUI elements by applying the first change to the first set of coordinates for the one tile upon which the interaction is detected and the second change to the second set of coordinates for each tile of the remainder of the plurality of tiles.

2. The method of claim 1, further comprising:

identifying, by the computing system, a second portion of the biomedical image based on the first change to be applied to the first set of coordinates defining the tile; and determining the second change to apply to the second set of coordinates based on a comparison of the first portion and the second portion.

3. The method of claim 1, wherein the plurality of GUI elements comprises a first GUI element to display a reference tile of the plurality of tiles and one or more second GUI elements to display corresponding one or more other tiles of the plurality of tiles.

4. The method of claim 1, wherein detecting the interaction further comprises detecting the interaction to perform at least one of a zoom operation within the one tile or a panning operation to move from the one tile.

5. The method of claim 1, wherein identifying the plurality of tiles further comprises streaming, to a client device, the plurality of tiles corresponding to the first portion of the biomedical image for display on the client device via the corresponding plurality of GUI elements.

6. The method of claim 1, further comprising:
adding, by the computing system, an annotation via a second GUI element of the plurality of GUI elements, the annotation identifying one or more pixel coordinates on a second tile of the plurality of tiles displayed via the second GUI element, the annotation indicating a presence of one or more conditions in an area on the tissue sample corresponding to the one or more pixel coordinates on the second tile; and
storing, by the computing system, in one or more data structures, an association between the annotation and the biomedical image.

7. The method of claim 6, further comprising generating, by the computing system, a plurality of indexed color values corresponding to the one or more pixel coordinates identified by the annotation; and
wherein storing the association further comprises storing the plurality of indexed color values as a map for the annotation.

8. The method of claim 6, further comprising updating, by the computing system, the displaying of the plurality of tiles in the corresponding plurality of GUI elements based on the annotation identified in the second tile displayed via the second GUI element.

9. The method of claim 1, further comprising:
identifying, by the computing system, for a third tile of the plurality of tiles, a respective portion of the biomedical image;
applying, by the computing system, a color modification operation on the respective portion for the at least one tile, while maintaining a remaining portion of the biomedical image; and
updating, by the computing system, the displaying of the third tile in a corresponding GUI element of the plurality of GUI elements based on application the color modification operation to the respective portion.

10. The method of claim 9, further comprising:
identifying, by the computing system, a source for the biomedical image from which the plurality of tiles is derived; and
selecting, by the computing system, from a plurality of color modification operations, the color modification operation based on the source identified for the biomedical image.

11. A system, comprising:
a computing system having one or more processors coupled to memory, configured to:
identify a plurality of tiles from a first portion of a biomedical image that is derived from a tissue sample on a slide via a histopathological image preparer, each tile of the plurality of tiles acquired at one of a plurality of magnification factors and defined by a respective corresponding set of coordinates within a same biomedical image, at least one of the plurality of tiles corresponding to at least a subset of the first portion of the same biomedical image that is derived from a same tissue sample on the slide, each tile individually responsive to a move or zoom operation via a corresponding graphical user interface (GUI) element and synchronizable to others of the plurality of tiles simultaneously displayed in corresponding GUI elements;
provide the plurality of tiles for concurrent display via a corresponding plurality of graphical user interface (GUI) elements;
detect an interaction with a GUI element from the plurality of GUI elements to modify presentation of one tile of the plurality of tiles;
identify a first change to a first set of coordinates defining the one tile in response to the interaction with the GUI element;
determine a second change to apply to a second set of coordinates defining each of others tile of a remainder of the plurality of tiles based on the first change to the first set of coordinates; and
update the display of the plurality of tiles in the corresponding plurality of GUI elements by applying the first change to the first set of coordinates for the tile upon which the interaction is detected and the second change to the second set of coordinates for each tile of the remainder of the plurality of tiles.

12. The system of claim 11, wherein the computing system is further configured to:
identify a second portion of the biomedical image based on the first change to be applied to the first set of coordinates defining the tile; and
determine the second change to apply to the second set of coordinates based on a comparison of the first portion and the second portion.

13. The system of claim 11, wherein the plurality of GUI elements comprises a first GUI element to display a reference tile of the plurality of tiles and one or more second GUI elements to display corresponding one or more other tiles of the plurality of tiles.

14. The system of claim 11, wherein the computing system is further configured to detect the interaction to perform at least one of a zoom operation within the one tile or a panning operation to move from the one tile.

15. The system of claim 11, wherein the computing system is further configured to stream, to a client device, the plurality of tiles corresponding to the first portion of the biomedical image for display on the client device via the corresponding plurality of GUI elements.

16. The system of claim 11, wherein the computing system is further configured to:
add an annotation via a second GUI element of the plurality of GUI elements, the annotation identifying one or more pixel coordinates on a second tile of the plurality of tiles displayed via the second GUI element, the annotation indicating a presence of one or more conditions in an area on the tissue sample corresponding to the one or more pixel coordinates on the second tile; and
store, in one or more data structures, an association between the annotation and the biomedical image.

17. The system of claim 16, further comprising:
generate a plurality of indexed color values corresponding to one or more pixel coordinates identified by the annotation; and
store the plurality of indexed color values as a map for the annotation.

18. The system of claim 16, wherein the computing system is further configured to update the display of the plurality of tiles in the corresponding plurality of GUI elements based on the annotation identified in the second tile displayed via the second GUI element.

19. The system of claim 11, wherein the computing system is further configured to:
- identify, for a third tile of the plurality of tiles, a respective portion of the biomedical image;
- apply a color modification operation on the respective portion for the at least one tile, while maintaining a remaining portion of the biomedical image; and
- update the displaying of the third tile in a corresponding GUI element of the plurality of GUI elements based on application the color modification operation to the respective portion.

20. The system of claim 19, wherein the computing system is further configured to:
- identify a source for the biomedical image from which the plurality of tiles is derived; and
- select, from a plurality of color modification operations, the color modification operation based on the source identified for the biomedical image.

* * * * *